United States Patent
Ishikawa et al.

(10) Patent No.: US 11,409,086 B2
(45) Date of Patent: Aug. 9, 2022

(54) VARIABLE MAGNIFICATION OPTICAL SYSTEM, OPTICAL EQUIPMENT, AND METHOD FOR PRODUCING VARIABLE MAGNIFICATION OPTICAL SYSTEM

(71) Applicant: Nikon Corporation, Tokyo (JP)

(72) Inventors: Takahiro Ishikawa, Kawasaki (JP); Norikazu Yokoi, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 17/279,737

(22) PCT Filed: Nov. 20, 2018

(86) PCT No.: PCT/JP2018/042794
§ 371 (c)(1),
(2) Date: Mar. 25, 2021

(87) PCT Pub. No.: WO2020/105111
PCT Pub. Date: May 28, 2020

(65) Prior Publication Data
US 2022/0035142 A1    Feb. 3, 2022

(51) Int. Cl.
*G02B 15/14* (2006.01)

(52) U.S. Cl.
CPC .................. *G02B 15/145* (2019.08)

(58) Field of Classification Search
CPC .......... G02B 15/145; G02B 15/145105; G02B 15/16; G02B 15/20
See application file for complete search history.

(56) References Cited

U.S. PATENT DOCUMENTS

2018/0284407 A1   10/2018   Iwasawa et al.
2019/0271836 A1   9/2019   Umeda et al.
(Continued)

FOREIGN PATENT DOCUMENTS

JP   H11-316342 A   11/1999
JP   2014-044246 A   3/2014
(Continued)

OTHER PUBLICATIONS

International Search Report from International Patent Application No. PCT/JP2018/042794, dated Feb. 26, 2019.
(Continued)

*Primary Examiner* — Jack Dinh
(74) *Attorney, Agent, or Firm* — SGPatents PLLC

(57) ABSTRACT

A variable magnification optical system comprising a plurality of lens groups which includes a first negative lens group having negative refractive power, a second negative lens group disposed at a more image side than the first negative lens group and having negative refractive power, a third negative lens group disposed at a more image side than the second negative lens group and having negative refractive power; upon varying a magnification, distances between adjacent lens groups being varied; the first negative lens group being movable to include a component in a direction perpendicular to the optical axis as a vibration reduction lens group; the second negative lens group being moved along the optical axis upon carrying out focusing; and the predetermined conditional expression (s) being satisfied. The variable magnification optical system can attain a high optical performance and be made in small in size.

32 Claims, 16 Drawing Sheets

(56) References Cited

U.S. PATENT DOCUMENTS

2019/0361212 A1  11/2019  Machida
2019/0377168 A1  12/2019  Umeda et al.

FOREIGN PATENT DOCUMENTS

| JP | 2015-018124 A | 1/2015 |
|----|---------------|--------|
| JP | 2018-169564 A | 11/2018 |
| WO | WO 2014/132291 A1 | 9/2014 |
| WO | WO 2018/066648 A1 | 4/2018 |
| WO | WO 2018/066649 A1 | 4/2018 |
| WO | WO 2018/092295 A1 | 5/2018 |

OTHER PUBLICATIONS

Office Action dated Mar. 8, 2022, in Japanese Patent Application No. 2020-557059.
Office Action dated Jan. 26, 2022, in Chinese Patent Application No. 201880096829.2.

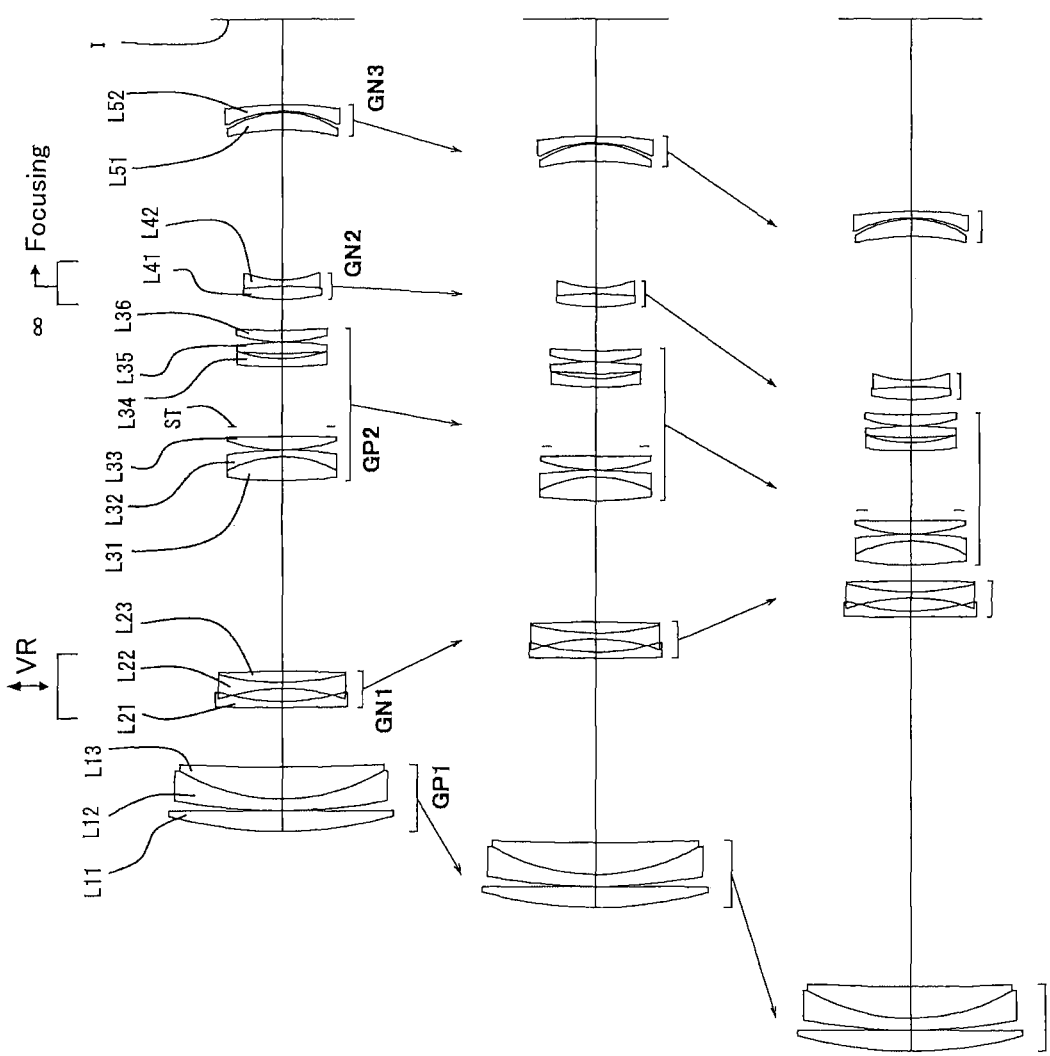

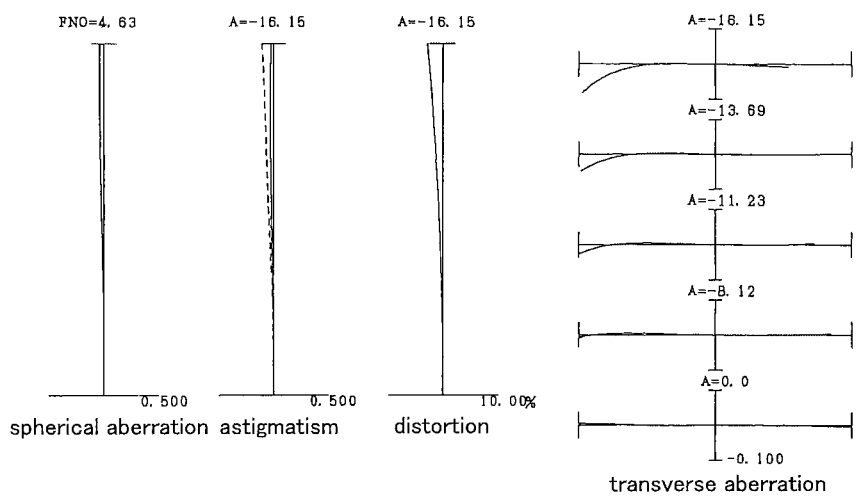
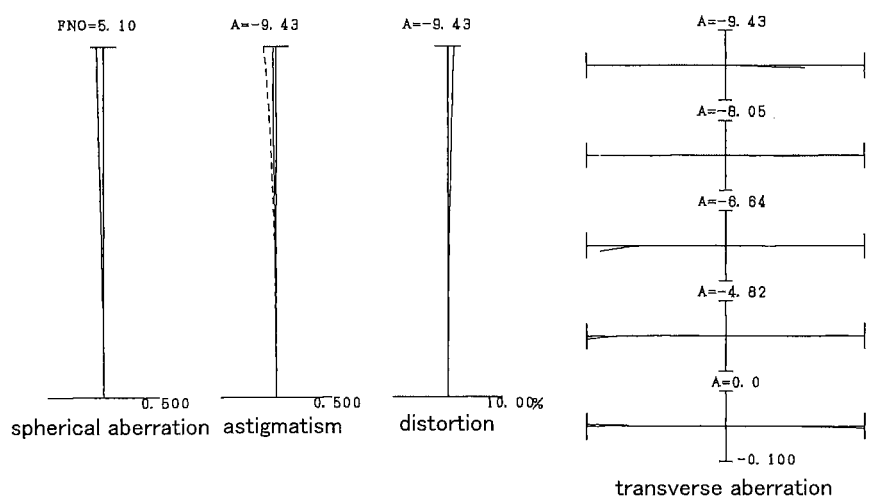
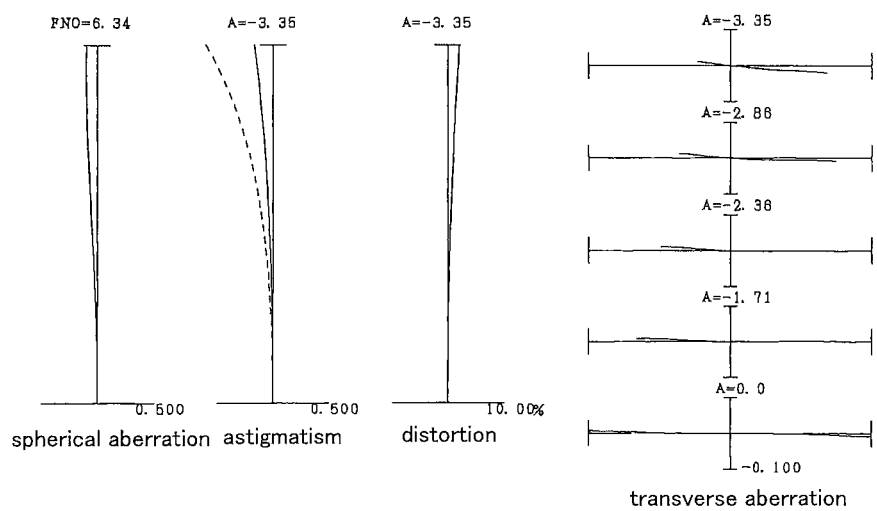

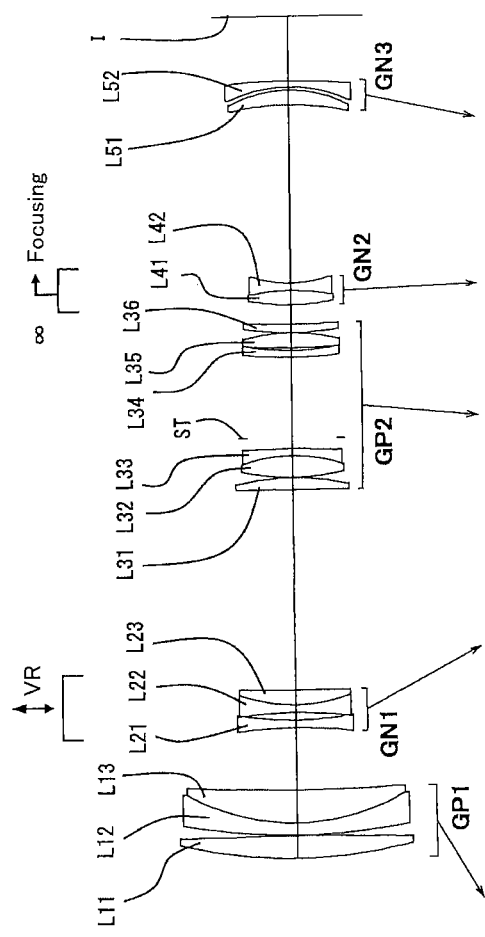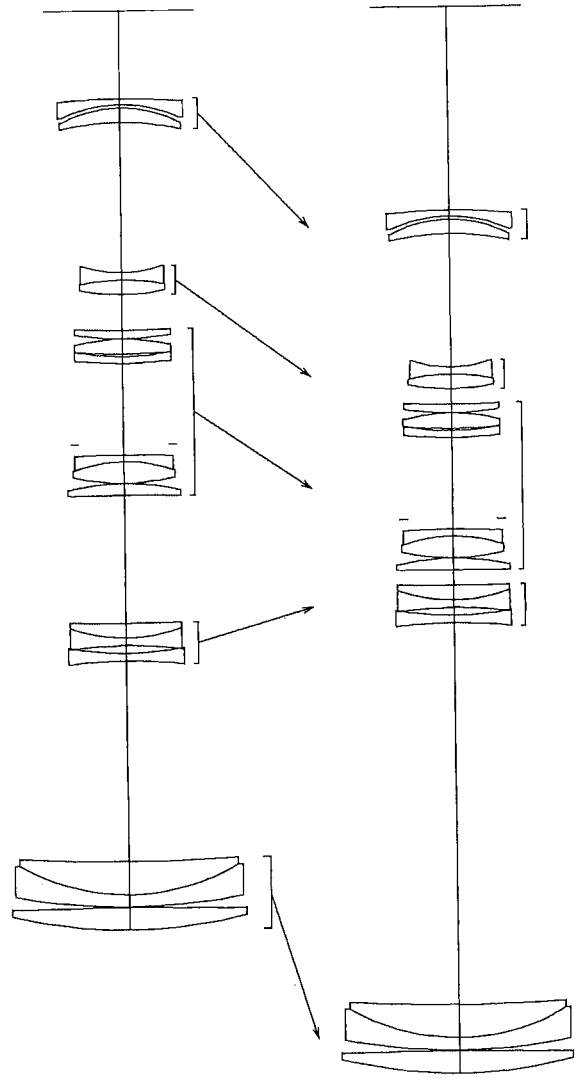
Fig.3A
Fig.3B
Fig.3C

VARIABLE MAGNIFICATION OPTICAL SYSTEM, OPTICAL EQUIPMENT, AND METHOD FOR PRODUCING VARIABLE MAGNIFICATION OPTICAL SYSTEM

TECHNICAL FIELD

The present invention relates to a variable magnification optical system, an optical equipment and a method for manufacturing the variable magnification optical system.

BACKGROUND ART

There has been proposed a variable magnification optical system that is equipped with a vibration reduction lens group for correcting an image blur (for example, refer to Japanese Patent Document 1). However, in the variable magnification optical system equipped with such a vibration reduction lens group, it is required to make further improvement in optical performance and make the vibration reduction lens group small in size.

PRIOR ART REFERENCE

Patent Document

Patent Document 1: Japanese Patent application Laid-Open Gazette No. 11-316342.

SUMMARY OF THE INVENTION

According to a first aspect of the present invention, there is provided a variable magnification optical system comprising a plurality of lens groups which include a first negative lens group having negative refractive power, a second negative lens group disposed at a more image side than the first negative lens group and having negative refractive power, and a third negative lens group disposed at a more image side than the second negative lens group and having negative refractive power;

upon varying a magnification, distances between adjacent lens groups being varied;

the first negative lens group being movable to include a component in a direction perpendicular to the optical axis as a vibration reduction lens group;

the second negative lens group being moved along the optical axis upon carrying out focusing, and the following conditional expression being satisfied:

$$0.500 < (-f3n)/\sqrt{(fw*ft)} < 2.500$$

where f3n denotes a focal length of the third negative lens group, fw denotes a focal length of the variable magnification optical system as a whole in a wide angle end state, and ft denotes a focal length of the variable magnification optical system as a whole in a telephoto end state.

Further, according to a second aspect of the present invention, there is provided a method for manufacturing a variable magnification optical system which comprises a plurality of lens groups including a first negative lens group having negative refractive power, a second negative lens group disposed at a more image side than the first negative lens group and having negative refractive power, and a third negative lens group disposed at a more image side than the second negative lens group and having negative refractive power; the method comprising steps of:

constructing such that, upon varying a magnification, distances between adjacent lens groups are varied;

constructing such that the first negative lens group is movable to include a component in a direction perpendicular to the optical axis as a vibration reduction lens group;

constructing such that the second negative lens group is moved along the optical axis upon carrying out focusing, and constructing such that the following conditional expression is satisfied:

$$0.500 < (-f3n)/\sqrt{(fw*ft)} < 2.500$$

where f3n denotes a focal length of the third negative lens group, fw denotes a focal length of the variable magnification optical system as a whole in a wide angle end state, and ft denotes a focal length of the variable magnification optical system as a whole in a telephoto end state.

BRIEF DESCRIPTION OF THE DRAWINGS

FIG. 1A, FIG. 1B and FIG. 1C are cross sectional views in a wide angle end state, in an intermediate focal length state and in a telephoto end state, respectively, of a variable magnification optical system according to a First Example.

FIG. 2A, FIG. 2B and FIG. 2C are graphs showing various aberrations, upon focusing on an infinite distance object, in the wide angle end state, in the intermediate focal length state, and in the telephoto end state, respectively, of the variable magnification optical system according to the First Example.

FIG. 3A, FIG. 3B and FIG. 3C are cross sectional views in a wide angle end state, in an intermediate focal length state and in a telephoto end state, respectively, of a variable magnification optical system according to a Second Example.

EMBODIMENT FOR CARRYING OUT THE INVENTION

Figure 4A:
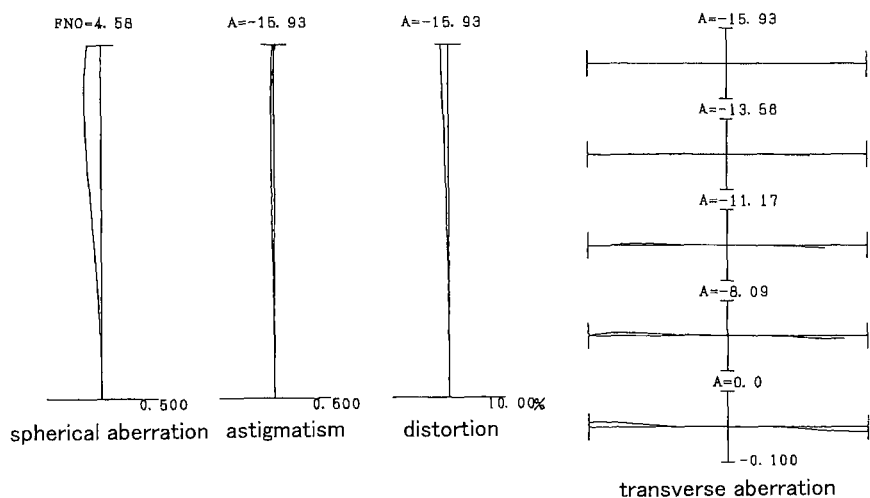
FIG. 4A, FIG. 4B and FIG. 4C are graphs showing various aberrations, upon focusing on an infinite distance object, in the wide angle end state, in the intermediate focal length state, and in the telephoto end state, respectively, of the variable magnification optical system according to the Second Example.

Hereinafter, a variable magnification optical system according to the present embodiment, an optical equipment and a method for manufacturing the variable magnification optical system, will be explained.

A variable magnification optical system according to a present embodiment comprises a plurality of lens groups including a first negative lens group having negative refractive power, a second negative lens group disposed at a more image side than the first negative lens group and having negative refractive power, and a third negative lens group disposed at a more image side than the second negative lens group and having negative refractive power;

upon varying a magnification, distances between adjacent lens groups being varied;

the first negative lens group being movable to include a component in a direction perpendicular to the optical axis as a vibration reduction lens group;

the second negative lens group being moved along the optical axis upon carrying out focusing, and the following conditional expression (1) being satisfied:

$$0.500 < (-f3n)/\sqrt{(fw*ft)} < 2.500 \quad (1)$$

where f3n denotes a focal length of the third negative lens group, fw denotes a focal length of the variable magnification optical system as a whole in a wide angle end state, and ft denotes a focal length of the variable magnification optical system as a whole in a telephoto end state.

In the variable magnification optical system according to the present embodiment, upon varying a magnification, distances between adjacent lens groups are varied. With taking this configuration, the variable magnification optical system according to the present embodiment can realize varying magnification and correct superbly various aberrations.

Further, in the variable magnification optical system according to the present embodiment, the first negative lens group is movable to include a component in a direction perpendicular to the optical axis as a vibration reduction lens group. With this configuration, image blur caused by a camera shake can be superbly corrected. Further, the first negative lens group is adopted as vibration reduction lens, thereby a compact vibration reduction lens may be realized, and thus a drive mechanism for the vibration reduction lens group may be made small in size, thereby performance of the vibration reduction lens group being able to be secured easily.

Further, in the variable magnification optical system according to the present embodiment, the second negative lens group is moved along the optical axis upon carrying out focusing. By adopting the second lens group disposed at the image side as a focusing lens group, it is possible to restrain variation in image magnification and make ratio of amount of change of image plane to movement of the second negative lens group upon carrying out focusing large.

The conditional expression (1) is a conditional expression for defining a proper range of a ratio of the focal length of the third negative lens group to a geometric mean value of the focal length in the wide angle end state and the focal length in the telephoto end state of the variable magnification optical system. With satisfying the conditional expression (1), in the variable magnification optical system according to the present embodiment, a curvature of field and other various aberrations can be corrected superbly upon varying magnification from the wide angle end state to the telephoto end state.

When the value of $(-f3n)/\sqrt{(fw*ft)}$ is equal to or exceeds the upper limit of the conditional expression (1), power of the third negative lens group becomes weak, and an amount of movement of the third negative lens group upon varying magnification becomes large. If it is intended to maintain the power of the third negative lens group and make the amount of movement of the third negative lens group small, it becomes difficult to correct curvature of field. Meanwhile, the advantageous effect of the present embodiment can be made more surely by setting the upper limit value of the conditional expression (1) to 2.400. Further, in order to attain the advantageous effect of the present embodiment further more surely, it is preferable to set the upper limit value of the conditional expression (1) to 2.300, 2.200, 2.100, 2.000, 1.950, 1.900, 1.850, 1.800 and further to 1.780.

On the other hand, when the value of $(-f3n)/\sqrt{(fw*ft)}$ is equal to or falls below the lower limit of the conditional expression (1), the focal length of the third negative lens group becomes short, so curvature of field generated at the third negative lens group becomes large. Meanwhile, the advantageous effect of the present embodiment may be made more surely by setting the lower limit value of the conditional expression (1) to 0.525. In order to secure the advantageous effect of the present invention further more surely, it is preferable to set the lower limit value of the conditional expression (1) to 0.550, 0.575, 0.600, 0.625, 0.650, 0.675, 0.700, 0.725, and more preferable to 0.750.

Further, in the variable magnification optical system according to the present embodiment, it is desirable that the following conditional expression (2) is satisfied:

$$0.200 < (-f1n)/\sqrt{(fw*ft)} < 0.400 \quad (2)$$

where f1n denotes a focal length of the first negative lens group, fw denotes a focal length of the variable magnification optical system as a whole in the wide angle end state, and ft denotes a focal length of the variable magnification optical system as a whole in the telephoto end state.

The conditional expression (2) is a conditional expression for defining a proper range of a ratio of the focal length of the first negative lens group to a geometric mean value of the focal length in the wide angle end state and the focal length in the telephoto end state of the variable magnification optical system. With satisfying the conditional expression (2), in the variable magnification optical system according to the present embodiment, a transverse magnification of the first negative lens group takes an appropriate value, and it is possible to restrain an influence by camera shake and the like caused at the time when the vibration reduction is conducted, thereby image blur being able to be corrected superbly.

When the value of $(-f1n)/\sqrt{(fw*ft)}$ is equal to or exceeds the upper limit of the conditional expression (2), the focal length of the first negative lens group becomes large, so an amount of movement of the first negative lens group upon varying magnification becomes large, thereby the entire length of the variable magnification optical system becoming large. Meanwhile, the advantageous effect of the present embodiment can be made more surely by setting the upper limit value of the conditional expression (2) to 0.390. Further, in order to attain the advantageous effect of the present embodiment further more surely, it is preferable to set the upper limit value of the conditional expression (2) to 0.380, 0.370, 0.360, 0.350, 0.340, 0.335, 0.330, 0.325, 0.320 and furthermore preferable to 0.315.

On the other hand, when the value of $(-f1n)/\sqrt{(fw*ft)}$ is equal to or falls below the lower limit of the conditional expression (2), it becomes difficult to correct coma aberration and astigmatism. Further, the focal length of the first negative lens group becomes small, thereby transverse magnification of the first negative lens group is changed, thereby influence to displacement of image in change in the direction perpendicular to the optical axis becoming large.

Meanwhile, the advantageous effect of the present embodiment may be made more surely by setting the lower limit value of the conditional expression (2) to 0.210. In order to secure the advantageous effect of the present invention further more surely, it is preferable to set the lower limit value of the conditional expression (2) to 0.220, 0.230, 0.235, 0.240, 0.245, 0.250, 0.255, 0.260, 0.265, and more preferable to 0.270.

Further, in the variable magnification optical system according to the present embodiment, it is desirable that the following conditional expression (3) is satisfied:

$$0.200 < (-f2n)/\sqrt{(fw*ft)} < 1.000 \quad (3)$$

where f2n denotes a focal length of the second negative lens group, fw denotes the focal length of the variable magnification optical system as a whole in the wide angle end state, and ft denotes the focal length of the variable magnification optical system as a whole in the telephoto end state.

The conditional expression (3) is a conditional expression for defining a proper range of a ratio of the focal length of the second negative lens group to the geometric mean value of the focal length in the wide angle end state and the focal length in the telephoto end state of the variable magnification optical system. With satisfying the conditional expression (3), the variable magnification optical system according to the present embodiment can correct superbly various aberrations upon focusing, and can be made small-sized.

When the value of $(-f2n)/\sqrt{(fw*ft)}$ is equal to or exceeds the upper limit of the conditional expression (3), the focal length of the second negative lens group becomes large, so an amount of movement of the second negative lens group upon varying magnification becomes large, thereby the entire length of the variable magnification optical system becoming large. Further, a ratio of variation in image plane relative to movement of the second negative lens group becomes small. Meanwhile, the advantageous effect of the present embodiment can be made more surely by setting the upper limit value of the conditional expression (3) to 0.950. Further, in order to attain the advantageous effect of the present embodiment further more surely, it is preferable to set the upper limit value of the conditional expression (3) to 0.900, 0.875, 0.850, 0.825, 0.800, 0.775, 0.750, 0.730, 0.725, and further more preferable to 0.720.

On the other hand, when the value of $(-f2n)/\sqrt{(fw*ft)}$ is equal to or falls below the lower limit of the conditional expression (3), the focal length of the second negative lens group becomes small, so curvature of field generated by the second negative lens group becomes large and it becomes difficult to correct aberrations upon focusing. Meanwhile, the advantageous effect of the present embodiment may be made more surely by setting the lower limit value of the conditional expression (3) to 0.250. In order to secure the advantageous effect of the present invention further more surely, it is preferable to set the lower limit value of the conditional expression (3) to 0.300, 0.350, 0.400, 0.425, 0.450, 0.475, 0.500, 0.510, 0.520, and more preferable to 0.530.

Further, in the variable magnification optical system according to the present embodiment, it is desirable that the following conditional expression (4) is satisfied:

$$-1.000 < \beta1nt/\beta2nt < -0.300 \quad (4)$$

where $\beta1nt$ denotes a transverse magnification of the first negative lens group in the telephoto end state, and $\beta2nt$ denotes a transverse magnification of the second negative lens group in the telephoto end state.

The conditional expression (4) is a conditional expression for defining a proper range of a ratio of the transverse magnification of the first negative lens group in the telephoto end state and the transverse magnification of the second negative lens group in the telephoto end state. With satisfying the conditional expression (4), the variable magnification optical system according to the present embodiment can restrain spherical aberration and curvature of field from generated in the first negative lens group and the second negative lens group.

When the value of $\beta1nt/\beta2nt$ is equal to or exceeds the upper limit of the conditional expression (4), the focal length of the first negative lens group becomes small, so spherical aberration and curvature of field generated by the first negative lens group become large. Further, the advantageous effect of the present embodiment may be made more surely by setting the upper limit value of the conditional expression (4) to −0.325. In order to secure the advantageous effect of the present embodiment further more surely, it is preferable to set the upper limit value of the conditional expression (4) to −0.350, −0.375, −0.400, −0.425, −0.450, −0.475, −0.500, −0.510, −0.520, and further to −0.530.

On the other hand, when the value of $\beta1nt/\beta2nt$ is equal to or falls below the lower limit of the conditional expression (4), the focal length of the second negative lens group becomes small, so curvature of field generated in the second negative lens group becomes large and it becomes difficult to correct aberrations upon focusing. Meanwhile, the advantageous effect of the present embodiment may be made more surely by setting the lower limit value of the conditional expression (4) to −0.975. In order to secure the advantageous effect of the present invention further more surely, it is preferable to set the lower limit value of the conditional expression (4) to −0.950, −0.925, −0.900, −0.880, −0.860, −0.850, −0840, −0.825, −0.810, and further to −0.800.

Further, in the variable magnification optical system according to the present embodiment, it is desirable that the following conditional expression (5) is satisfied:

$$0.050 < X1n/\sqrt{(fw*ft)} < 0.250 \qquad (5)$$

where X1n denotes an amount of movement of the first negative lens group at the time of varying magnification from the wide angle end state to the telephoto end state, assuming that direction of movement toward the image side is positive, fw denotes the focal length of the variable magnification optical system as a whole in the wide angle end state, and ft denotes the focal length of the variable magnification optical system as a whole in the telephoto end state.

Assuming that direction of movement toward the image side is positive, the conditional expression (5) is a conditional expression for defining a proper range of a ratio of the amount of movement of the first negative lens group upon varying magnification from the wide angle end state to the telephoto end state to a geometric mean value of the focal length in the wide angle end state and the focal length in the telephoto end state of the variable magnification optical system. With satisfying the conditional expression (5), the variable magnification optical system according to the present embodiment can correct superbly spherical aberration and curvature of field.

When the value of X1n/√(fw*ft) is equal to or exceeds the upper limit value of the conditional expression (5), the focal length of the first negative lens group becomes large, so an amount of movement of the first negative lens group upon varying magnification becomes large, thereby variations in spherical aberration and curvature of field become large. If it is intended to correct the variations in these aberrations by any other lens group, the focal length of the other groups could be small and spherical aberration generated in the other group would become large. Further, since the amount of the movement of the first negative lens group upon varying magnification becomes large, diameter and total length of the variable magnification optical system would become large. Meanwhile, the advantageous effect of the present embodiment can be made more surely by setting the upper limit value of the conditional expression (5) to 0.240. Further, in order to attain the advantageous effect of the present embodiment further more surely, it is preferable to set the upper limit value of the conditional expression (5) to 0.230, 0.220, 0.210, 0.200, 0.195, 0.190, 0.185, 0.180, 0.175 and further to 0.170.

On the other hand, when the value of X1n/√(fw*ft) is equal to or falls below the lower limit value of the conditional expression (5), the focal length of the first negative lens group becomes small, so spherical aberration and curvature of field generated in the first negative lens group would become large. Meanwhile, the advantageous effect of the present embodiment can be made more surely by setting the lower limit value of the conditional expression (5) to 0.060. Further, in order to attain the advantageous effect of the present embodiment further more surely, it is preferable to set the lower limit value of the conditional expression (5) to 0.070, 0.080, 0.090, 0.095, 0.100, 0.105, 0.110, 0.115, 0.120 and further to 0.125.

Further, it is desirable that in the variable magnification optical system according to the present embodiment the first negative lens group includes, in order from the object side, a first negative lens, a second negative lens and a positive lens. With taking this configuration, the variable magnification optical system according to the present embodiment can prevent light rays out of angle of view from reaching the imaging plane after repeatedly reflected.

Further, in the variable magnification optical system according to the present embodiment, it is desirable that the second negative lens group includes a positive lens and a negative lens. With taking this configuration, the variable magnification optical system according to the present embodiment can restrain curvature of field and chromatic aberration upon carrying out short distance focusing from being generated.

Further, in the variable magnification optical system according to the present embodiment, it is desirable that the third negative lens group is disposed at a most image side. With taking this configuration, the variable magnification optical system according to the present embodiment can correct curvature of field and other various aberrations superbly.

Further, in the variable magnification optical system according to the present embodiment, it is desirable that an aperture stop is disposed between the first negative lens group and the second negative lens group. By disposing the negative lens group behind the aperture stop as such, the variable magnification optical system according to the present embodiment can restrain variation in angle of view upon carrying out focusing.

Further, it is desirable that the variable magnification optical system according to the present embodiment includes, in order from the object side, a first positive lens group having positive refractive power, the first negative lens group, a second positive lens group having positive refractive power, the second negative lens group and the third negative lens group. With taking this configuration, the variable magnification optical system according to the present embodiment can be made small in size and realize a high optical performance that various aberrations are corrected superbly.

Further, it is desirable that the variable magnification optical system according to the present embodiment includes, in order from the object side, a first positive lens group having positive refractive power, the first negative lens group, a second positive lens group having positive refractive power, the second negative lens group and the third negative lens group, and satisfies the following conditional expression (6):

$$0.500 < f2p/(-f1n) < 1.500 \qquad (6)$$

where f2p denotes a focal length of the second positive lens group, and f1n denotes a focal length of the first negative lens group.

The variable magnification optical system according to the present embodiment, which includes, in order from the object side, the first positive lens group having positive refractive power, the first negative lens group, the second positive lens group having positive refractive power, the second negative lens group and the third negative lens group, can be made small in size and realize a high optical performance that various aberrations are corrected superbly.

The conditional expression (6) is a conditional expression for defining a proper range of a ratio of the focal length of the second positive lens group to the focal length of the first negative lens group. With satisfying the conditional expression (6), the variable magnification optical system according to the present embodiment can correct superbly spherical aberration and curvature of field.

When the value of f2p/(−f1n) is equal to or exceeds the upper limit value of the conditional expression (6), the focal length of the first negative lens group becomes short, so spherical aberration and curvature of field generated in the first negative lens group would become large. Meanwhile, the advantageous effect of the present embodiment can be made more surely by setting the upper limit value of the conditional expression (6) to 1.450. Further, in order to attain the advantageous effect of the present embodiment further more surely, it is preferable to set the upper limit value of the conditional expression (6) to 1.400, 1.360, 1.330, 1.300, 1.275, 1.250, 1.225, 1.200, 1.175, and further to 1.150.

On the other hand, when the value of f2p/(−f1n) is equal to or falls below the lower limit of the conditional expression (6), the focal length of the first negative lens group becomes large, so an amount of movement of the first negative lens group upon varying the magnification becomes large, and variations in spherical aberration and curvature of field would become large. Further, since the amount of movement of the first negative lens group becomes large upon varying the magnification, diameter and total length of the variable magnification optical system become large also. Further, since the focal length of the second positive lens group becomes small, spherical aberration generated in the second positive lens group becomes large. Meanwhile, the advantageous effect of the present embodiment may be made more surely by setting the lower limit value of the conditional expression (6) to 0.600. In order to secure the advantageous effect of the present invention further more surely, it is preferable to set the lower limit value of the conditional expression (6) to 0.700, 0.750, 0.800, 0.850, 0.875, 0.900, 0.925, 0.950, 0.975, and further to 1.000.

Further, it is desirable that the variable magnification optical system according to the present embodiment includes, in order from the object side, a first positive lens group having positive refractive power, the first negative lens group, a second positive lens group having positive refractive power, the second negative lens group and the third negative lens group, and satisfies the following conditional expression (7):

$$-0.300 < X2p/\sqrt{(fw \cdot ft)} < 0.000 \quad (7)$$

where X2p denotes an amount of movement of the second positive lens group upon varying the magnification from the wide angle end state to the telephoto end state, assuming that direction of movement toward the image side is positive, fw denotes the focal length of the variable magnification optical system as a whole in the wide angle end state, and ft denotes the focal length of the variable magnification optical system as a whole in the telephoto end state.

Since the variable magnification optical system according to the present embodiment includes, in order from the object side, the first positive lens group having positive refractive power, the first negative lens group, the second positive lens group having positive refractive power, the second negative lens group and the third negative lens group, it is possible to make the optical system which is small in size and which has high optical performance that can correct various aberrations superbly.

The conditional expression (7) is a conditional expression for defining a proper range of a ratio of the amount of movement of the second positive lens group upon varying the magnification from the wide angle end state to the telephoto end state to the geometric mean value of the focal length in the wide angle end state and the focal length in the telephoto end state of the variable magnification optical system, assuming that direction of movement toward the image side is positive. With satisfying the conditional expression (7), the variable magnification optical system according to the present embodiment can correct superbly coma aberration and other various aberrations.

When the value of X2p/√(fw*ft) is equal to or exceeds the upper limit of the conditional expression (7), power of the second positive lens group becomes weak, so power of the first negative lens group becomes strong to maintain magnification varying ratio, thereby it becoming difficult to correct coma aberration and astigmatism. Meanwhile, the advantageous effect of the present embodiment can be made more surely by setting the upper limit value of the conditional expression (7) to −0.020. Further, in order to attain the advantageous effect of the present embodiment further more surely, it is preferable to set the upper limit value of the conditional expression (7) to −0.030, −0.040, −0.050, −0.060, −0.070, −0.080, −0.090, −0.100, −0.110 and further to −0.120.

On the other hand, when the value of X2p/√(fw*ft) is equal to or falls below the lower limit of the conditional expression (7), power of the second positive lens group becomes strong, and spherical aberration becomes excessively corrected in the telephoto end state. Further, it becomes difficult to correct coma aberration and curvature of field. Meanwhile, the advantageous effect of the present embodiment can be made more surely by setting the lower limit value of the conditional expression (7) to −0.290. Further, in order to attain the advantageous effect of the present embodiment further more surely, it is preferable to set the lower limit value of the conditional expression (7) to −0.280, −0.270, −0.260, −0.250, −0.240, −0.230, −0.220, −0.210, −0.205, and further to −0.200.

Further, it is desirable that the variable magnification optical system according to the present embodiment includes, in order from the object side, a first positive lens group having positive refractive power, the first negative lens group, a second positive lens group having positive refractive power, the second negative lens group and the third negative lens group, and that upon varying the magnification the first positive lens group is moved. With taking this configuration, the variable magnification optical system according to the present embodiment can restrain variations in spherical aberration and in curvature of field upon varying the magnification, and can conduct varying the magnification effectively and be made small in size.

Further, it is desirable that the variable magnification optical system according to the present embodiment satisfies the following conditional expression (8):

$$0.150 < Bfaw/fw < 0.500 \quad (8)$$

where Bfaw denotes an air converted back focus of the variable magnification optical system as a whole in the wide angle end state, and fw denotes the focal length of the variable magnification optical system as a whole in the wide angle end state.

The conditional expression (8) is a conditional expression for defining a proper range of a ratio of the air converted back focus of the variable magnification optical system as a whole in the telephoto end state to the focal length of the variable magnification optical system as a whole in the wide angle end state. With satisfying the conditional expression (8), the variable magnification optical system according to the present embodiment can correct superbly coma aberration and other various aberrations in the wide angle end state.

When the value of Bfaw/fw is equal to or exceeds the upper limit value of the conditional expression (8) of the variable magnification optical system according to the present embodiment, the air converted back focus relative to the focal length of the variable magnification optical system in the wide angle end state becomes too large, so it becomes difficult to correct coma aberration and other various aberrations in the wide angle end state. Meanwhile, the advantageous effect of the present embodiment can be made more surely by setting the upper limit value of the conditional expression (8) to 0.480. Further, in order to secure the advantageous effect of the present embodiment further more surely, it is preferable to set the upper limit value of the conditional expression (8) to 0.460, 0.450, 0.440, 0.420, 0.400, 0.390, 0.380, 0.370, and further preferable to 0.360.

On the other hand, when the value of Bfaw/fw in the conditional expression (8) of the variable magnification optical system according to the present embodiment, is equal to or falls below the lower limit value, the back focus relative to the focal length of the variable magnification optical system in the wide angle end state becomes too small, so it becomes difficult to correct coma aberration and other various aberrations in the wide angle end state.

Meanwhile, the advantageous effect of the present embodiment can be made more surely by setting the lower limit value of the conditional expression (8) to 0.160. Further, in order to secure the advantageous effect of the present embodiment further more surely, it is preferable to set the lower limit value of the conditional expression (8) to 0.170, 0.180, 0.190, 0.200, 0.210, and further preferable to 0.220.

Further, it is desirable that the variable magnification optical system according to the present embodiment satisfies the following conditional expression (9):

$$20.000° < 2\omega w < 45.000° \quad (9)$$

where $2\omega w$ denotes a total angle of view of the variable magnification optical system in the wide angle end state.

The conditional expression (9) is a conditional expression for defining a proper range of the total angle of view of the variable magnification optical system in the wide angle end state. With satisfying the conditional expression (9), the variable magnification optical system according to the present embodiment can correct superbly curvature of field and distortion, while having wide angle of view.

It is preferable to set the upper limit value of the conditional expression (9) to 43.000° in order to secure the advantageous effect of the present embodiment. Further, in order to secure the advantageous effect of the present embodiment more surely, it is preferable to set the upper limit value of the conditional expression (9) to 40.000°, 38.000°, 36.000°, and further to 35.000°.

Further, in order to secure the advantageous effect of the present embodiment, it is preferable to set the lower limit value of the conditional expression (9) to 22.000°. Further, in order to secure the advantageous effect of the present embodiment more surely, it is preferable to set the lower limit value of the conditional expression (9) to 24.000°, 25.000°, 26.000° and further to 27.000°.

Further, in the variable magnification optical system according to the present embodiment, it is desirable that the following conditional expression (10) is satisfied:

$$1.500 < (\beta 1nt-1)*\beta Rt < 4.500 \quad (10)$$

where $\beta 1nt$ denotes a transverse magnification of the first negative lens group in the telephoto end state, and $\beta Rt$ denotes a composite transverse magnification of all lens groups disposed at a more image side than the first negative lens group in the telephoto end state.

The conditional expression (10) is a conditional expression for defining a proper range of the product of the transverse magnification of the first negative lens group in the telephoto end state multiplied by the composite transverse magnification of all lens groups disposed at more image side than the first negative lens group in the telephoto end state.

With satisfying the conditional expression (10), the variable magnification optical system according to the present embodiment can correct superbly coma aberration and curvature of field. Further, there is less deterioration in optical performance where eccentricity occurs, so it is preferable.

When the value of $((\beta 1nt-1)*\beta Rt$ is equal to or exceeds the upper limit value of the conditional expression (10) of the variable magnification optical system according to the present embodiment, power of the first negative lens group becomes strong, and it becomes difficult to correct coma aberration and astigmatism. Meanwhile, the advantageous effect of the present embodiment can be secured by setting the upper limit value of the conditional expression (10) to 4.400. Further, in order to secure the advantageous effect of the present embodiment more surely, it is preferable to set the upper limit value of the conditional expression (10) to 4.300, 4.200, 4.100, 4.000, 3.900, 3.800, 3.700, 3.600, and further to 3.500.

On the other hand, when the value of $((\beta 1nt-1)*\beta Rt$ in the conditional expression (10) of the variable magnification optical system according to the present embodiment, is equal to or falls below the lower limit value, power of the first negative lens group becomes weak, and an amount of movement of the first negative lens group upon varying the magnification becomes large. Therefore, if it is intended to increase a magnification ratio while maintaining the small amount of movement of the first negative lens group, power of other lens groups would become strong. This causes excessive correction of spherical aberration in the telephoto end state, thus making corrections of coma aberration and curvature of field difficult. Meanwhile, the advantageous effect of the present embodiment can be secured by setting the lower limit value of the conditional expression (10) to 1.600. Further, in order to secure the advantageous effect of the present embodiment more surely, it is preferable to set the lower limit value of the conditional expression (10) to 1.700, 1.800, 1.900, 2.000, 2.100, 2.200, 2.300, 2.400, 2.500 and further to 2.600.

Further, it is desirable that the variable magnification optical system according to the present embodiment comprises, in order from the object side, a first positive lens group having positive refractive power, the first negative lens group, a second positive lens group having positive refractive power, the second negative lens group, and the third negative lens group, and satisfies the following conditional expression (11):

$$0.500 < m12tw/fw < 2.000 \quad (11)$$

where m12tw denotes an amount of change in a distance between the first positive lens group and the first negative lens group upon varying the magnification from the wide angle end state to the telephoto end state, and fw denotes the focal length of the variable magnification optical system as a whole in the wide angle end state.

The variable magnification optical system according to the present embodiment, which comprises, in order from the object side, the first positive lens group having positive refractive power, the first negative lens group, the second positive lens group having positive refractive power, the second negative lens group and the third negative lens group, can be made small in size and realize high optical performance that can correct superbly various aberrations.

The conditional expression (11) is a conditional expression for defining a proper range of a ratio of the amount of change in the distance between the first positive lens group and the first negative lens group upon varying the magnification from the wide angle end state to the telephoto end state and the focal length of the variable magnification optical system as a whole in the wide angle end state. With satisfying the conditional expression (11), the variable magnification optical system according to the present embodiment can correct superbly spherical aberration, chromatic aberration and other various aberrations in the telephoto end state.

When the value of m12tw/fw is equal to or exceeds the upper limit value of the conditional expression (11) of the variable magnification optical system according to the present embodiment, powers of the first positive lens group and the first negative lens group are become weak, and it becomes difficult to correct spherical aberration. Further, the entire length of the variable magnification optical system becomes increased. Meanwhile, the advantageous effect of the present embodiment can be made sure by setting the upper limit value of the conditional expression (11) to 1.900. Further, in order to secure the advantageous effect more surely, it is preferable to set the upper limit value of the conditional expression (11) to 1.800, 1.700, 1.650, 1.600, 1.550, 1.500, 1.450, 1.400, 1.350, and further to 1.300.

On the other hand, when the value of m12tw/fw in the conditional expression (11) of the variable magnification optical system according to the present embodiment, is equal to or falls below the lower limit value, power of the first positive lens group becomes strong, and corrections of spherical aberration, longitudinal chromatic aberration and chromatic aberration of magnification become difficult. Meanwhile, the advantageous effect of the present embodiment can be made more surely by setting the lower limit value of the conditional expression (11) to 0.600. Further, in order to secure the advantageous effect further more surely, it is preferable to set the lower limit value of the conditional expression (11) to 0.700, 0.800, 0.850, 0.900, 0.950, 1.000, 1.050, and further to 1.100.

Further, it is desirable that the variable magnification optical system according to the present embodiment comprises, in order from the object side, a first positive lens group having positive refractive power, the first negative lens group, a second positive lens group having positive refractive power, the second negative lens group and the third negative lens group, and satisfies the following conditional expression (12):

$$0.150 < (-f1n)/f1p < 0.350 \quad (12)$$

where f1n denotes the focal length of the first negative lens group, and f1p denotes a focal length of the first positive lens group.

The variable magnification optical system according to the present embodiment, which comprises, in order from the object side, the first positive lens group having positive refractive power, the first negative lens group, the second positive lens group having positive refractive power, the second negative lens group and the third negative lens group, can be made small in size and realize high optical performance that can correct superbly various aberrations.

The conditional expression (12) is a conditional expression for defining a proper range of a ratio of the focal length of the first negative lens group to the focal length of the first positive lens group. With satisfying the conditional expression (12), the variable magnification optical system according to the present embodiment can suppress variations in spherical aberration and other various aberrations upon varying the magnification from the wide angle end state to the telephoto end state.

When the value of (−f1n)/f1p is equal to or exceeds the upper limit of the conditional expression (12), refractive power of the first positive lens group becomes too strong, so it becomes difficult to restrain variations in spherical aberration and other various aberrations upon varying the magnification. Meanwhile, the advantageous effect of the present embodiment can be made more sure by setting the upper limit value of the conditional expression (12) to 0.340. Further, in order to attain the advantageous effect of the present embodiment further more surely, it is preferable to set the upper limit value of the conditional expression (12) to 0.330, 0.320, 0.310, 0.300, 0.290, 0.280, 0.270, 0.260, and further to 0.250.

On the other hand, when the value of (−f1n)/f1p is equal to or falls below the lower limit of the conditional expression (12), refractive power of the first negative lens group becomes too strong, so it becomes difficult to restrain variations in spherical aberration and other various aberrations upon varying the magnification. Meanwhile, the advantageous effect of the present embodiment can be made more sure by setting the lower limit value of the conditional expression (12) to 0.160. Further, in order to attain the advantageous effect of the present embodiment further more surely, it is preferable to set the lower limit value of the conditional expression (12) to 0.170, 0.180, 0.190, 0.200, and further to 0.210.

Further, it is desirable that the variable magnification optical system according to the present embodiment includes, in order from the object side, a first positive lens group having positive refractive power, the first negative lens group, a second positive lens group having positive refractive power, the second negative lens group, and the third negative lens group, and satisfies the following conditional expression (13):

$$0.010 < (-f3n)/f1p < 3.000 \quad (13)$$

where f3n denotes a focal length of the third negative lens group, and f1p denotes a focal length of the first positive lens group.

The variable magnification optical system according to the present embodiment, which includes, in order from the object side, the first positive lens group having positive refractive power, the first negative lens group, the second positive lens group having positive refractive power, the second negative lens group, and the third negative lens group, can be made compact and realize a high optical performance that various aberrations are corrected superbly.

The conditional expression (13) is a conditional expression for defining a proper range of a ratio of the focal length of the third negative lens group to the focal length of the first positive lens group. With satisfying the conditional expression (13), the variable magnification optical system according to the present embodiment can suppress variations in coma aberration and other various aberrations upon varying the magnification from the wide angle end state to the telephoto end state.

When the value of (−f3n)/f1p is equal to or exceeds the upper limit of the conditional expression (13), refractive power of the first positive lens group becomes too strong, so it becomes difficult to restrain variations in coma aberration and other various aberrations upon varying the magnification.

Meanwhile, the advantageous effect of the present embodiment can be made more sure by setting the upper limit value of the conditional expression (13) to 2.800. Further, in order to attain the advantageous effect of the present embodiment further more surely, it is preferable to set the upper limit value of the conditional expression (13) to 2.600, 2.400, 2.200, 2.000, 1.800, 1.700, 1.600, and further to 1.500.

On the other hand, when the value of (−f3n)/f1p is equal to or falls below the lower limit of the conditional expression (13), refractive power of the first negative lens group becomes too strong, so it becomes difficult to restrain variations in coma aberration and other various aberrations upon varying the magnification.

Meanwhile, the advantageous effect of the present embodiment may be made more sure by setting the lower limit value of the conditional expression (13) to 0.050. In order to secure the advantageous effect of the present invention further more surely, it is preferable to set the lower limit value of the conditional expression (13) to 0.100, 0.150, 0.200, 0.250, 0.300, 0.350, 0.400, 0.450, 0.500, and further to 0.550.

Further, it is desirable that the variable magnification optical system according to the present embodiment includes, in order from the object side, a first positive lens group having positive refractive power, the first negative lens group, a second positive lens group having positive refractive power, the second negative lens group, and the third negative lens group, and satisfies the following conditional expression (14):

$$0.050 < f2n/f3n < 1.500 \qquad (14)$$

where f2n denotes a focal length of the second negative lens group, and f3n denotes a focal length of the third negative lens group.

The variable magnification optical system according to the present embodiment, which includes, in order from the object side, the first positive lens group having positive refractive power, the first negative lens group, the second positive lens group having positive refractive power, the second negative lens group, and the third negative lens group, can be made compact and realize a high optical performance that various aberrations are corrected superbly.

The conditional expression (14) is a conditional expression for defining a proper range of a ratio of the focal length of the second negative lens group to the focal length of the third negative lens group. With satisfying the conditional expression (14), the variable magnification optical system according to the present embodiment can correct superbly curvature of field and other various aberrations upon varying the magnification from the wide angle end state to the telephoto end state.

When the value of f2n/f3n is equal to or exceeds the upper limit value of the conditional expression (14), refractive power of the third negative lens group becomes too strong, so it becomes difficult to correct superbly curvature of field and other various aberrations upon varying the magnification. Meanwhile, the advantageous effect of the present embodiment can be made more sure by setting the upper limit value of the conditional expression (14) to 1.400. Further, in order to attain the advantageous effect of the present embodiment further more surely, it is preferable to set the upper limit value of the conditional expression (14) to 1.300, 1.200, 1.100, 1.000, 0.950 and further to 0.900.

On the other hand, when the value of f2n/f3n is equal to or falls below the lower limit value of the conditional expression (14), refractive power of the second negative lens group becomes too strong, so it becomes difficult to correct superbly curvature of field and other various aberrations upon varying the magnification.

Meanwhile, the advantageous effect of the present embodiment may be made more sure by setting the lower limit value of the conditional expression (14) to 0.100. In order to secure the advantageous effect of the present invention further more surely, it is preferable to set the lower limit value of the conditional expression (14) to 0.150, 0.200, 0.225, 0.250, 0.275, 0.290 and further to 0.300.

Further, it is desirable that the variable magnification optical system according to the present embodiment includes, in order from the object side, a first positive lens group having positive refractive power, the first negative lens group, a second positive lens group having positive refractive power, the second negative lens group, and the third negative lens group, and satisfies the following conditional expression (15):

$$0.080 < (RR-RF)/(RR+RF) < 1.000 \qquad (15)$$

where RR denotes a radius of curvature of a most image side lens surface of the third negative lens group, and RF denotes a radius of curvature of a most object side lens surface of the third negative lens group.

The variable magnification optical system according to the present embodiment, which includes, in order from the object side, the first positive lens group having positive refractive power, the first negative lens group, the second positive lens group having positive refractive power, the second negative lens group, and the third negative lens group, can be made compact and realize a high optical performance that various aberrations are corrected superbly.

The conditional expression (15) is a conditional expression for defining a shape of the most image side lens surface of the third negative lens group and a shape of the most object side lens surface of the third negative lens group. With satisfying the conditional expression (15), the variable magnification optical system according to the present embodiment can correct superbly coma aberration and curvature of field in the telephoto end state.

When the value of (RR−RF)/(RR+RF) is equal to or exceeds the upper limit value of the conditional expression (15), it becomes difficult to correct superbly coma aberration and other various aberrations. Meanwhile, the advantageous effect of the present embodiment can be made more sure by setting the upper limit value of the conditional expression (15) to 0.950. Further, in order to attain the advantageous effect of the present embodiment further more surely, it is preferable to set the upper limit value of the conditional expression (15) to 0.900, 0.850, 0.800, 0.775, 0.750, 0.725, 0.700, 0.690, and further to 0.680.

On the other hand, when the value of (RR−RF)/(RR+RF) is equal to or falls below the lower limit value of the conditional expression (15), it becomes difficult to correct superbly curvature of field and other various aberrations. Meanwhile, the advantageous effect of the present embodiment can be made more sure by setting the lower limit value of the conditional expression (15) to 0.085. Further, in order to attain the advantageous effect of the present embodiment further more surely, it is preferable to set the lower limit value of the conditional expression (15) to 0.090, 0.095, 0.100, 0.105, 0.110, 0.115, and further to 0.120.

Further, it is desirable that the variable magnification optical system according to the present embodiment includes, in order from the object side, a first positive lens group having positive refractive power, the first negative lens group, a second positive lens group having positive refractive power, the second negative lens group and the third negative lens group, and satisfies the following conditional expression (16):

$$-10.000 < RF/Bfaw < -1.500 \qquad (16)$$

where RF denotes the radius of curvature of the most object side lens surface of the third negative lens group, and Bfaw denotes the air converted back focus of the variable magnification optical system as a whole in the wide angle end state.

The variable magnification optical system according to the present embodiment includes, in order from the object side, the first positive lens group having positive refractive power, the first negative lens group, the second positive lens group having positive refractive power, the second negative lens group and the third negative lens group, so it is possible to make the optical system which is small in size and which has high optical performance that can correct various aberrations superbly.

The conditional expression (16) is a conditional expression for defining a proper range of a ratio of a radius of curvature of the most object side lens surface in the third negative lens group and an air converted back focus of the variable magnification optical system as a whole in the wide angle end state. With satisfying the conditional expression (16), the variable magnification optical system according to the present embodiment, can correct superbly curvature of field, and also is effective for reducing generation of ghost.

When the value of RF/Bfaw is equal to or exceeds the upper limit value of the conditional expression (16), it becomes difficult to correct curvature of field and other various aberrations. Meanwhile, the advantageous effect of the present embodiment can be made more sure by setting the upper limit value of the conditional expression (16) to −1.600. Further, in order to attain the advantageous effect of the present embodiment furthermore surely, it is preferable to set the upper limit value of the conditional expression (16) to −1.700, −1.800, −1.900, −2.000 and further to −2.100.

On the other hand, when the value of RF/Bfaw is equal to or falls below the lower limit of the conditional expression (16), it becomes difficult to correct curvature of field and other various aberrations. Meanwhile, the advantageous effect of the present embodiment can be made more sure by setting the lower limit value of the conditional expression (16) to −9.000. Further, in order to attain the advantageous effect of the present embodiment further more surely, it is preferable to set the lower limit value of the conditional expression (16) to −8.000, −7.000, −6.000, −5.500, −5.000, −4.500, −4.000, and further to −3.800.

An optical equipment of the present embodiment has the variable magnification optical system having the above described configuration, whereby it is possible to realize an optical equipment which is improved in optical performance and whose vibration reduction lens group is small-sized.

A method for manufacturing a variable magnification optical system according to the present embodiment, is a method for manufacturing a variable magnification optical system which comprises a plurality of lens groups including a first negative lens group having negative refractive power, a second negative lens group disposed at a more image side than the first negative lens group and having negative refractive power, and a third negative lens group disposed at a more image side than the second negative lens group and having negative refractive power; the method comprising steps of:

constructing such that, upon varying a magnification, distances between adjacent lens groups are varied;

constructing such that, the first negative lens group is movable to include a component in a direction perpendicular to the optical axis as a vibration reduction lens group;

constructing such that the second negative lens group is moved along the optical axis upon carrying out focusing, and constructing such that the following conditional expression (1) is satisfied:

$$0.500 < (-f3n)/\sqrt{(fw*ft)} < 2.500 \qquad (1)$$

where f3n denotes a focal length of the third negative lens group, fw denotes a focal length of the variable magnification optical system as a whole in a wide angle end state, and ft denotes a focal length of the variable magnification optical system as a whole in a telephoto end state.

By this method, it is possible to realize an optical equipment which is improved in optical performance and whose vibration reduction lens group is small-sized.

Hereinafter, the variable magnification optical systems relating to numerical examples of the present embodiment will be explained with reference to the accompanying drawings.

First Example

FIG. 1A, FIG. 1B and FIG. 1C are, respectively, cross sectional views in a wide angle end state, in an intermediate focal length state and in a telephoto end state, of a variable magnification optical system according to a First Example. Arrows below respective lens groups in FIG. 1A show directions of movements of respective lens groups upon varying magnification from the wide angle end state to the intermediate focal length state. Arrows below respective lens groups in FIG. 1B show directions of movements of respective lens groups upon varying magnification from the intermediate focal length state to the telephoto end state.

The variable magnification optical system according to the present Example is composed of, in order from an object side, a first positive lens group GP1 having positive refractive power that is a first lens group, a first negative lens group GN1 having negative refractive power that is a second lens group, a second positive lens group GP2 having positive refractive power that is a third lens group, a second negative lens group GN2 having negative refractive power that is a fourth lens group, and a third negative lens group GN3 having negative refractive power that is a fifth lens group.

The first positive lens group GP1 consists of, in order from the object side, a positive meniscus lens L11 having a convex surface facing the object side, and a cemented positive lens constructed by a negative meniscus lens L12 having a convex surface facing the object side cemented with a positive meniscus lens L13 having a convex surface facing the object side.

The first negative lens group GN1 consists of, in order from the object side, a negative meniscus lens L21 having a convex surface facing the object side, and a cemented negative lens constructed by a double concave negative lens L22 cemented with a double convex positive lens L23.

The second positive lens group GP2 consists of, in order from the object side, a cemented positive lens constructed by a double convex positive lens L31 cemented with a negative meniscus lens L32 having a concave surface facing the object side, a positive meniscus lens L33 having a convex surface facing the object side, an aperture stop ST, a negative meniscus lens L34 having a convex surface facing the object side, a double convex positive lens L35 and a positive meniscus lens L36 having a convex surface facing the object side.

The second negative lens group GN2 consists of, in order from the object side, a cemented negative lens constructed by a double convex positive lens L41 cemented with a double concave negative lens L42.

The third negative lens group GN3 consists of, in order from the object side, a positive meniscus lens L51 having a concave surface facing the object side, and a negative meniscus lens L52 having a concave surface facing the object side.

On the image plane I, an imaging device (not shown) composed of CCD, CMOS or the like is disposed.

In the variable magnification optical system according to the present Example, upon varying the magnification from the wide angle end state to the telephoto end state, the first positive lens group GP1, the first negative lens group GN1, the second positive lens group GP2, the second negative lens group GN2 and the third negative lens group GN3 are moved along the optical axis such that a distance between the first positive lens group GP1 and the first negative lens group GN1, a distance between the first negative lens group GN1 and the second positive lens group GP2, a distance between the second positive lens group GP2 and the second negative lens group GN2, and a distance between the second negative lens group GN2 and the third negative lens group GN3, are varied. In detail, the first positive lens group GP1 is moved toward the object side, the first negative lens group GN1 is moved toward the image side, the second positive lens group GP2 is moved toward the object side, the second negative lens group GN2 is moved toward the object side, and the third negative lens group GN3 is moved toward the object side.

In the variable magnification optical system according to the present Example, focusing from an infinite distance object to a close distance object is carried out by moving the second negative lens group GN2 along the optical axis toward the image side.

In the variable magnification optical system according to the present Example, correction of image plane upon image blur being generated, that is, vibration reduction, is carried out by moving the first negative lens group GN1 as a vibration reduction lens group to include a component in a direction perpendicular to the optical axis.

Table 1 below shows various values of the variable magnification optical system relating to the present Example.

In Table 1, "f" denotes a focal length, and BF denotes a back focus, that is, a distance on the optical axis from the most image side lens surface to the image plane I.

In [Surface Data], "m" denotes an order of an optical surface counted from the object side, "r" denotes a radius of curvature, "d" denotes a surface-to-surface distance, that is, an interval from an n-th surface to an (n+1)-th surface, where n is an integer, "nd" denotes refractive index at d-line (wavelength λ=587.6 nm) and "vd" denotes an Abbe number at d-line (wavelength λ=587.6 nm). Further, "OP" denotes an object surface, "Dn" denotes a variable surface-to-surface distance, where n is an integer, "ST" denotes an aperture stop, and "I" denotes an image plane. Meanwhile, radius of curvature r=∞ denotes a plane surface, and refractive index of the air nd=1.00000 is omitted.

In [Various Data], "f" denotes a focal length of the variable magnification optical system as a whole, "FNo" denotes an F-number, "ω" denotes a half angle of view (unit "°"), "Y" denotes an image height, and "TL" denotes a total length of the variable magnification optical system, that is, a distance on the optical axis from the first surface to the image plane I. "BF" denotes a back focus, that is, a distance on the optical axis from a most image side lens surface to the image plane I, and "BF (air converted length)" is an air converted back focus. Meanwhile, "W" denotes a wide angle end state, "M" denotes an intermediate focal length state, and "T" denotes a telephoto end state.

In [Variable Distance Data], "DO" denotes a distance from the object to the most object side lens surface, and "MG" denotes a photo taking magnification. Also, "f" denotes a focal length of the variable magnification optical system as a whole. "Dn" denotes a surface-to-surface distance from n-th surface to (n+1)-th surface, where n is an integer. Further, "W" denotes a wide-angle end state, "M" denotes an intermediate focal length state, and "T" denotes a telephoto end state, In [Lens Group Data], a starting surface number "ST" and a focal length "f" of each lens group are shown.

In [Values for Conditional Expressions], values with respect to respective conditional expressions are shown.

The focal length f, the radius of curvature r and other units on the lengths described in Table 1 involve using generally [mm], however, the optical system acquires the equal optical performance even when proportionally enlarged or reduced and is not therefore limited to this unit.

Note that the descriptions of the reference numerals and symbols in Table 1 are the same in the subsequent Examples.

TABLE 1

First Example

[Surface Data]

| m | r | d | nd | vd |
|---|---|---|---|---|
| OP | ∞ | | | |
| 1 | 87.93190 | 4.100 | 1.51680 | 64.1 |
| 2 | 303555.26000 | 0.100 | | |
| 3 | 121.99600 | 2.300 | 1.60342 | 38.0 |
| 4 | 42.16570 | 6.300 | 1.48749 | 70.3 |
| 5 | 450.00450 | D5 | | |
| 6 | 539.75280 | 1.200 | 1.77250 | 49.6 |
| 7 | 44.56390 | 2.596 | | |
| 8 | −40.08110 | 1.200 | 1.80610 | 41.0 |
| 9 | 53.94500 | 2.200 | 1.94595 | 18.0 |
| 10 | −287.19930 | D10 | | |
| 11 | 81.30600 | 4.750 | 1.49700 | 81.6 |
| 12 | −24.71700 | 1.300 | 1.85026 | 32.4 |
| 13 | −81.98450 | 0.100 | | |
| 14 | 35.58090 | 2.650 | 1.51823 | 58.8 |
| 15 | 66022.91900 | 2.000 | | |
| 16 | ST | 11.870 | | |
| 17 | 71.97160 | 1.700 | 1.90200 | 25.3 |
| 18 | 30.66560 | 0.965 | | |
| 19 | 82.45900 | 2.230 | 1.74400 | 44.8 |
| 20 | −82.45900 | 0.100 | | |
| 21 | 32.77810 | 2.250 | 1.79500 | 45.3 |
| 22 | 115.59770 | D22 | | |
| 23 | 38.49580 | 2.560 | 1.80518 | 25.4 |
| 24 | −75.09340 | 1.300 | 1.80610 | 41.0 |
| 25 | 21.42360 | D25 | | |

TABLE 1-continued

First Example

| 26 | −51.00010 | 3.420 | 1.58913 | 61.2 |
|---|---|---|---|---|
| 27 | −20.93150 | 0.310 | | |
| 28 | −24.80380 | 1.250 | 1.91082 | 35.2 |
| 29 | −82.90360 | D29 | | |
| I | ∞ | | | |

[Various Data]
Variable magnification ratio: 4.71

| | W | M | T |
|---|---|---|---|
| f | 51.50 | 86.28 | 242.80 |
| FNo | 4.63 | 5.10 | 6.34 |
| ω | 16.1 | 9.4 | 3.3 |
| Y | 14.50 | 14.50 | 14.50 |
| TL | 161.202 | 176.253 | 204.667 |
| BF | 16.906 | 23.174 | 38.120 |
| BF(air converted length) | 16.906 | 23.174 | 38.120 |

[Variable Distance Data]

| | W | M | T |
|---|---|---|---|
| D0 | ∞ | ∞ | ∞ |
| MG | — | — | — |
| f | 51.50 | 86.28 | 242.80 |
| D5 | 11.800 | 36.593 | 73.195 |
| D10 | 37.855 | 24.078 | 3.134 |
| D22 | 6.151 | 8.639 | 3.000 |
| D25 | 29.739 | 25.019 | 28.466 |

[Lens Group Data]

| | ST | f |
|---|---|---|
| 1st Positive Lens Group GP1 | 1 | 141.50 |
| 1st Negative Lens Group GN1 | 6 | −32.88 |
| 2nd Positive Lens Group GP2 | 11 | 33.68 |
| 2nd Negative Lens Group GN2 | 23 | −66.49 |
| 3rd Negative Lens Group GN3 | 26 | −113.67 |

[Values for Conditional Expressions]

(1) (−f3n)/√(fw*ft) = 1.016
(2) (−f1n)/√(fw*ft) = 0.294
(3) (−f2n)/√(fw*ft) = 0.595
(4) β1nt/β2nt = −0.734
(5) X1n/√(fw*ft) = 0.160
(6) f2p/(−f1n) = 1.024
(7) X2p/√(fw*ft) = −0.150
(8) Bfaw/fw = 0.328
(9) 2ωw = 32.297°
(10) (β1nt − 1)*βRt = 2.990
(11) m12tw/fw = 1.192
(12) (−f1n)/f1p = 0.232
(13) (−f3n)/f1p = 0.803
(14) f2n/f3n = 0.585
(15) (RR − RF)/(RR + RF) = 0.238
(16) RF/Bfaw = −3.017

FIG. 2A, FIG. 2B and FIG. 2C are graphs showing various aberrations upon focusing on an infinite distance object, respectively, in the wide angle end state, in the intermediate focal length state and in the telephoto end state, of the variable magnification optical system according to the First Example.

In the respective graphs showing aberrations, "FNO" denotes an F-number, and "A" denotes an incident angle of light rays, that is, a half angle of view (unit "°"). In respective aberration graphs, aberration curves at d-line (wavelength λ=587.6 nm) are shown. In each graph showing spherical aberration, value of F-number corresponding to the maximum aperture is shown. In each graph showing astigmatism and distortion, a half angle of view is indicated. In graphs showing astigmatism, a solid line indicates a sagittal image plane, and a broken line indicates a meridional image plane. In graphs showing transverse aberrations, meridional transverse aberration in each half angle of view "A" is indicated. Meanwhile, the reference symbols in graphs showing various aberrations are the same in the subsequent Examples.

As is apparent from the above-mentioned graphs showing aberrations, the zoom lens system relating to the First Example can correct superbly various aberrations over the wide angle end state to the telephoto end state and has excellent optical performance.

Second Example

FIG. 3A, FIG. 3B and FIG. 3C are, respectively, cross sectional views in a wide angle end state, in an intermediate focal length state and in a telephoto end state, of a variable magnification optical system according to a Second Example. Arrows below respective lens groups in FIG. 3A show directions of movements of respective lens groups upon varying magnification from the wide angle end state to the intermediate focal length state. Arrows below respective lens groups in FIG. 3B show directions of movements of respective lens groups upon varying magnification from the intermediate focal length state to the telephoto end state.

The variable magnification optical system according to the present Example is composed of, in order from an object side, a first positive lens group GP1 having positive refractive power that is a first lens group, a first negative lens group GN1 having negative refractive power that is a second lens group, a second positive lens group GP2 having positive refractive power that is a third lens group, a second negative lens group GN2 having negative refractive power that is a fourth lens group, and a third negative lens group GN3 having negative refractive power that is a fifth lens group.

The first positive lens group GP1 consists of, in order from the object side, a double convex lens L11, and a cemented positive lens constructed by a negative meniscus lens L12 having a convex surface facing the object side cemented with a positive meniscus lens L13 having a convex surface facing the object side.

The first negative lens group GN1 consists of, in order from the object side, a double concave negative lens L21, and a cemented negative lens constructed by a double concave negative lens L22 cemented with a positive meniscus lens L23 having a convex surface facing the object side.

The second positive lens GP2 consists of, in order from the object side, a positive meniscus lens L31 having a concave surface facing the object side, a cemented negative lens constructed by a double convex positive lens L32 cemented with a negative meniscus lens L33 having a concave surface facing the object side, an aperture stop ST, a negative meniscus lens L34 having a convex surface facing the object side, a double convex positive lens L35 and a positive meniscus lens L36 having a convex surface facing the object side.

The second negative lens group GN2 consists of, in order from the object side, a cemented negative lens constructed by a double convex positive lens L41 cemented with a double concave negative lens L42.

The third negative lens group GN3 consists of, in order from the object side, a positive meniscus lens L51 having a concave surface facing the object side, and a negative meniscus lens L52 having a concave surface facing the object side.

On the image plane I, an imaging device (not shown) composed of CCD, CMOS or the like is disposed.

In the variable magnification optical system according to the present Example, as configured above, upon varying magnification from the wide angle end state to the telephoto end state, the first positive lens group GP1, the first negative lens group GN1, the second positive lens group GP2, the second negative lens group GN2 and the third negative lens group GN3 are moved along the optical axis such that a distance between the first positive lens group GP1 and the first negative lens group GN1, a distance between the first negative lens group GN1 and the second positive lens group GP2, a distance between the second positive lens group GP2 and the second negative lens group GN2, and a distance between the second negative lens group GN2 and the third negative lens group GN3, are varied. In detail, the first positive lens group GP1 is moved toward the object side, the first negative lens group GN1 is moved toward the image side, the second positive lens group GP2 is moved toward the object side, the second negative lens group GN2 is once moved toward the image side and then moved toward the object side, and the third negative lens group GN3 is moved toward the object side.

In the variable magnification optical system according to the present Example, focusing from an infinite distance object to a close distance object is carried out by moving the second negative lens group GN2 along the optical axis toward the image side.

In the variable magnification optical system according to the present Example, correction of image plane upon image blur being generated, that is, vibration reduction, is carried out by moving the first negative lens group GN1 as a vibration reduction lens group to include a component in a direction perpendicular to the optical axis.

Table 2 below shows various values of the variable magnification optical system relating to the present Example.

TABLE 2

Second Example

[Surface Data]

| m | r | d | nd | vd |
|---|---|---|---|---|
| OP | ∞ | | | |
| 1 | 93.89670 | 4.243 | 1.51680 | 64.1 |
| 2 | −1137.60310 | 0.200 | | |
| 3 | 120.67270 | 2.300 | 1.60342 | 38.0 |
| 4 | 42.51470 | 6.300 | 1.48749 | 70.3 |
| 5 | 337.43420 | D5 | | |
| 6 | −92.89570 | 1.450 | 1.74400 | 44.8 |
| 7 | 62.46930 | 1.456 | | |
| 8 | −77.48380 | 1.450 | 1.79952 | 42.1 |
| 9 | 30.83830 | 2.780 | 1.92286 | 20.9 |
| 10 | 338.71580 | D10 | | |
| 11 | −904.06660 | 2.214 | 1.80610 | 41.0 |
| 12 | −46.99250 | 0.100 | | |
| 13 | 44.29830 | 4.100 | 1.49700 | 81.6 |
| 14 | −29.19740 | 1.300 | 2.00100 | 29.1 |
| 15 | −197.75100 | 2.000 | | |
| 16 | ST | 15.500 | | |
| 17 | 84.89920 | 1.300 | 1.85026 | 32.4 |
| 18 | 48.64540 | 0.470 | 1.00000 | |
| 19 | 99.43000 | 2.868 | 1.62299 | 58.1 |
| 20 | −37.99330 | 0.100 | | |
| 21 | 61.34970 | 1.602 | 1.48749 | 70.3 |
| 22 | 200.00000 | D22 | | |
| 23 | 41.49380 | 2.750 | 1.79504 | 28.7 |
| 24 | −39.97280 | 1.400 | 1.80440 | 39.6 |
| 25 | 23.36740 | D25 | | |
| 26 | −52.32020 | 2.766 | 1.53172 | 48.8 |
| 27 | −24.78880 | 0.609 | | |

TABLE 2-continued

Second Example

| 28 | −27.81550 | 1.150 | 1.83400 | 37.2 |
|---|---|---|---|---|
| 29 | −121.04380 | D29 | | |
| I | ∞ | | | |

[Various Data]
Variable magnification ratio: 4.72

| | W | M | T |
|---|---|---|---|
| f | 51.51 | 84.96 | 242.88 |
| FNo | 4.59 | 4.86 | 6.31 |
| ω | 15.9 | 9.4 | 3.3 |
| Y | 14.50 | 14.50 | 14.50 |
| TL | 160.482 | 175.164 | 203.122 |
| BF | 12.355 | 16.729 | 38.705 |
| BF(air converted length) | 12.355 | 16.729 | 38.705 |

[Variable Distance Data]

| | W | M | T |
|---|---|---|---|
| D0 | ∞ | ∞ | ∞ |
| MG | — | — | — |
| f | 51.51 | 84.96 | 242.88 |
| D5 | 11.800 | 38.203 | 72.641 |
| D10 | 38.397 | 24.496 | 3.000 |
| D22 | 3.618 | 6.802 | 3.000 |
| D25 | 33.903 | 28.525 | 25.366 |
| D29 | 12.355 | 16.729 | 38.705 |

[Lens Group Data]

| | ST | f |
|---|---|---|
| First Positive Lens Group GP1 | 1 | 145.31 |
| First Negative Lens Group GN1 | 6 | −33.97 |
| Second Positive Lens Group GP2 | 11 | 35.17 |
| Second Negative Lens Group GN2 | 23 | −71.56 |
| Third Negative Lens Group GN3 | 26 | −86.27 |

[Values for Conditional Expressions]

Figure 4B:
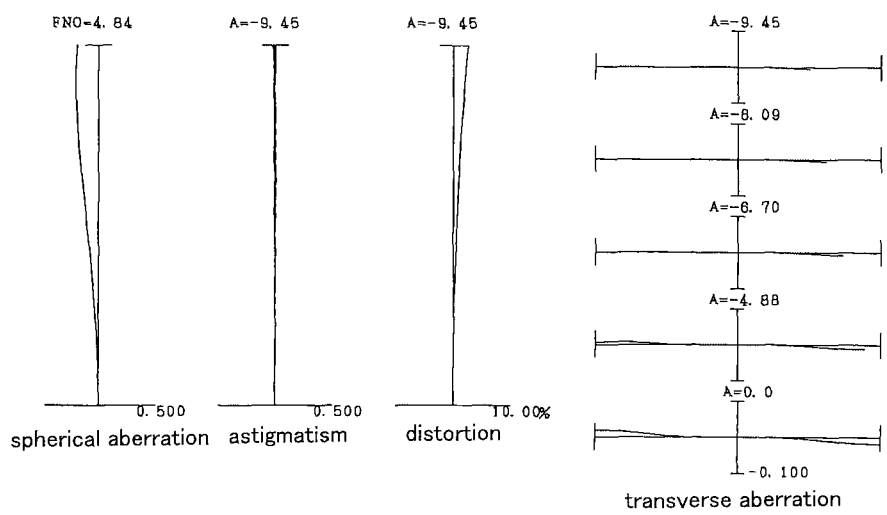
Figure 4C:
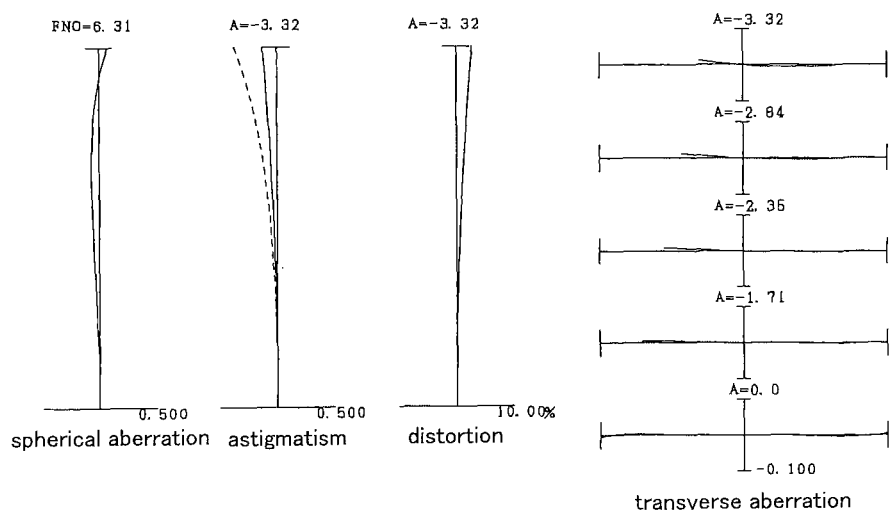

(1) $(-f3n)/\sqrt{(fw \cdot ft)} = 0.771$
(2) $(-f1n)/\sqrt{(fw \cdot ft)} = 0.304$
(3) $(-f2n)/\sqrt{(fw \cdot ft)} = 0.640$
(4) $\beta 1nt/\beta 2nt = -0.714$
(5) $X1n/\sqrt{(fw \cdot ft)} = 0.163$
(6) $f2p/(-f1n) = 1.035$
(7) $X2p/\sqrt{(fw \cdot ft)} = -0.154$
(8) $Bfaw/fw = 0.240$
(9) $2\omega w = 31.854°$
(10) $(\beta 1nt - 1) \cdot \beta Rt = 3.040$
(11) $m12tw/fw = 1.181$
(12) $(-f1n)/f1p = 0.234$
(13) $(-f3n)/f1p = 0.594$
(14) $f2n/f3n = 0.829$
(15) $(RR - RF)/(RR + RF) = 0.396$
(16) $RF/Bfaw = -4.235$ FIG. 4A, FIG. 4B and FIG. 4C are graphs showing various aberrations upon focusing on an infinite distance object, respectively, in the wide angle end state, in the intermediate focal length state and in the telephoto end state, of the variable magnification optical system according to the Second Example.

As is apparent from the above-mentioned graphs showing aberrations, the zoom lens system relating to the Second Example can correct superbly various aberrations over the wide angle end state to the telephoto end state and has excellent optical performance.

Third Example

Figures 5A, 5B, 5C:
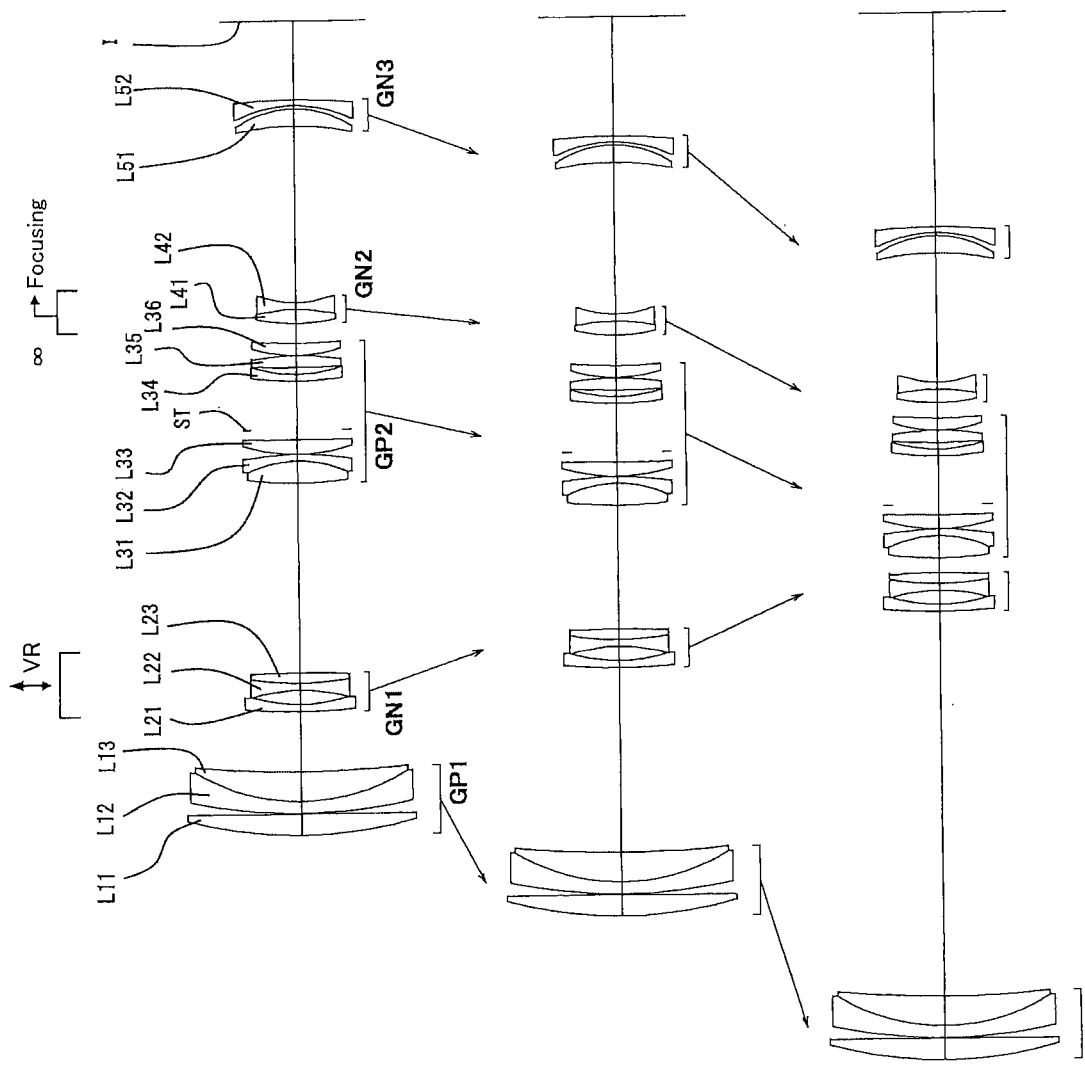
FIG. 5A, FIG. 5B and FIG. 5C are cross sectional views in a wide angle end state, in an intermediate focal length state and in a telephoto end state, respectively, of a variable magnification optical system according to a Third Example.

FIG. 5A, FIG. 5B and FIG. 5C are, respectively, cross sectional views in a wide angle end state, in an intermediate focal length state and in a telephoto end state, of a variable magnification optical system according to a Third Example.

Arrows below respective lens groups in FIG. 5A show directions of movements of respective lens groups upon varying magnification from the wide angle end state to the intermediate focal length state. Arrows below respective lens groups in FIG. 5B show directions of movements of respective lens groups upon varying magnification from the intermediate focal length state to the telephoto end state.

The variable magnification optical system according to the present Example is composed of, in order from an object side, a first positive lens group GP1 having positive refractive power that is a first lens group, a first negative lens group GN1 having negative refractive power that is a second lens group, a second positive lens group GP2 having positive refractive power that is a third lens group, a second negative lens group GN2 having negative refractive power that is a fourth lens group, and a third negative lens group GN3 having negative refractive power that is a fifth lens group.

The first positive lens group GP1 consists of, in order from the object side, a double convex positive lens L11, and a cemented positive lens constructed by a negative meniscus lens L12 having a convex surface facing the object side cemented with a positive meniscus lens L13 having a convex surface facing the object side.

The first negative lens group GN1 consists of, in order from the object side, a negative meniscus lens L21 having a convex surface facing the object side, and a cemented negative lens constructed by a double concave negative lens L22 cemented with a double convex positive lens L23.

The second positive lens group GP2 consists of, in order from the object side, a cemented positive lens constructed by a double convex positive lens L31 cemented with a negative meniscus lens L32 having a concave surface facing the object side, a positive meniscus lens L33 having a convex surface facing the object side, an aperture stop ST, a negative meniscus lens L34 having a convex surface facing the object side, a double convex positive lens L35 and a positive meniscus lens L36 having a convex surface facing the object side.

The second negative lens group GN2 consists of, in order from the object side, a cemented negative lens constructed by a double convex positive lens L41 cemented with a double concave negative lens L42.

The third negative lens group GN3 consists of, in order from the object side, a positive meniscus lens L51 having a concave surface facing the object side, and a negative meniscus lens L52 having a concave surface facing the object side.

On the image plane I, an imaging device (not shown) composed of CCD, CMOS or the like is disposed.

In the variable magnification optical system according to the present Example, upon varying magnification from the wide angle end state to the telephoto end state, the first positive lens group GP1, the first negative lens group GN1, the second positive lens group GP2, the second negative lens group GN2 and the third negative lens group GN3 are moved along the optical axis such that a distance between the first positive lens group GP1 and the first negative lens group GN1, a distance between the first negative lens group GN1 and the second positive lens group GP2, a distance between the second positive lens group GP2 and the second negative lens group GN2, and a distance between the second negative lens group GN2 and the third negative lens group GN3, are varied. In detail, the first positive lens group GP1 is moved toward the object side, the first negative lens group GN1 is moved toward the image side, the second positive lens group GP2 is moved toward the object side, the second negative lens group GN2 is moved toward the object side, and the third negative lens group GN3 is moved toward the object side.

In the variable magnification optical system according to the present Example, focusing from an infinite distance object to a close distance object is carried out by moving the second negative lens group GN2 along the optical axis toward the image side.

In the variable magnification optical system according to the present Example, correction of image plane upon image blur being generated, that is, vibration reduction, is carried out by moving the first negative lens group GN1 as a vibration reduction lens group to include a component in a direction perpendicular to the optical axis.

Table 3 below shows various values of the variable magnification optical system relating to the present Example.

TABLE 3

Third Example

[Surface Data]

| m | r | d | nd | νd |
|---|---|---|---|---|
| OP | ∞ | | | |
| 1 | 85.79135 | 4.163 | 1.51680 | 64.1 |
| 2 | −21581.11600 | 0.200 | | |
| 3 | 106.31189 | 2.300 | 1.60342 | 38.0 |
| 4 | 40.99918 | 5.805 | 1.48749 | 70.3 |
| 5 | 217.68087 | D5 | | |
| 6 | 116.23286 | 1.400 | 1.78590 | 44.2 |
| 7 | 34.74553 | 2.700 | | |
| 8 | −36.56350 | 1.400 | 1.78590 | 44.2 |
| 9 | 58.57482 | 2.025 | 1.94595 | 18.0 |
| 10 | −215.47554 | D10 | | |
| 11 | 78.51586 | 4.305 | 1.49700 | 81.6 |
| 12 | −24.01014 | 1.300 | 2.00100 | 29.1 |
| 13 | −69.47425 | 0.100 | | |
| 14 | 37.52112 | 2.769 | 1.74400 | 44.8 |
| 15 | 356.77312 | 2.000 | | |
| 16 | ST | 9.567 | | |
| 17 | 66.52484 | 1.300 | 1.95000 | 29.4 |
| 18 | 29.40073 | 1.300 | | |
| 19 | 135.60665 | 2.350 | 1.79952 | 42.1 |
| 20 | −56.95917 | 0.100 | | |
| 21 | 30.08650 | 2.350 | 1.62299 | 58.1 |
| 22 | 114.10158 | D22 | | |
| 23 | 36.98000 | 2.700 | 1.79504 | 28.7 |
| 24 | −38.17047 | 1.400 | 1.80440 | 39.6 |
| 25 | 21.71795 | D25 | | |
| 26 | −58.00000 | 3.400 | 1.53172 | 48.8 |
| 27 | −21.24736 | 0.598 | | |
| 28 | −27.04205 | 1.150 | 1.91082 | 35.2 |
| 29 | −112.40885 | D29 | | |
| I | ∞ | | | |

[Various Data]
Variable magnification ratio: 4.71

| | W | M | T |
|---|---|---|---|
| f | 51.60 | 86.50 | 242.99 |
| FNo | 4.63 | 5.23 | 6.33 |
| ω | 16.2 | 9.5 | 3.4 |
| Y | 14.50 | 14.50 | 14.50 |
| TL | 159.517 | 176.163 | 204.962 |
| BF | 15.441 | 23.366 | 41.940 |
| BF (air converted length) | 15.441 | 23.366 | 41.940 |

TABLE 3-continued

Third Example

[Variable Distance Data]

|  | W | M | T |
|---|---|---|---|
| D0 | ∞ | ∞ | ∞ |
| MG | — | — | — |
| f | 51.60 | 86.50 | 242.99 |
| D5 | 11.800 | 36.104 | 75.112 |
| D10 | 37.219 | 24.327 | 3.000 |
| D22 | 3.874 | 5.974 | 3.000 |
| D25 | 34.500 | 29.709 | 25.227 |
| D29 | 15.441 | 23.366 | 41.940 |

[Lens Group Data]

|  | ST | f |
|---|---|---|
| First Positive Lens Group GP1 | 1 | 146.89 |
| First Negative Lens Group GN1 | 6 | −33.04 |
| Second Positive Lens Group GP2 | 11 | 33.07 |
| Second Negative Lens Group GN2 | 23 | −71.59 |
| Third Negative Lens Group GN3 | 26 | −106.43 |

[Values for Conditional Expressions]

Figure 6A:
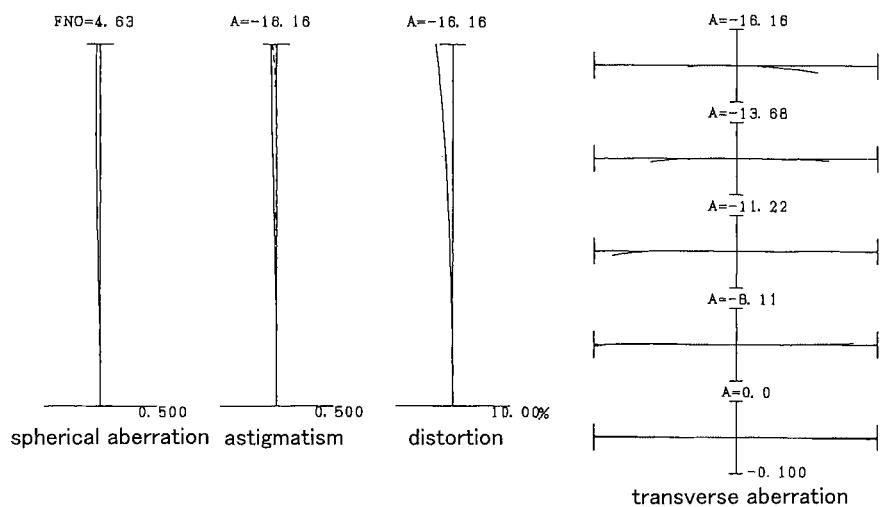
FIG. 6A, FIG. 6B and FIG. 6C are graphs showing various aberrations, upon focusing on an infinite distance object, in the wide angle end state, in the intermediate focal length state, and in the telephoto end state, respectively, of the variable magnification optical system according to the Third Example.
Figure 6B:
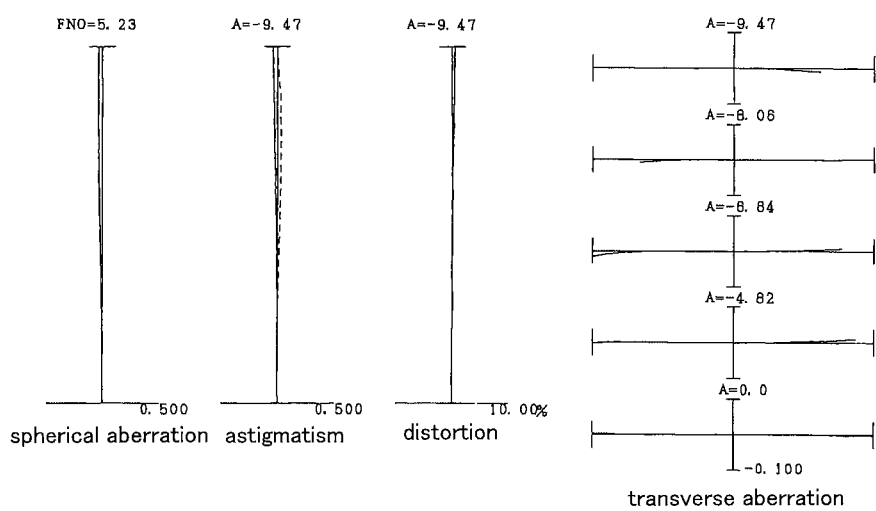
Figure 6C:
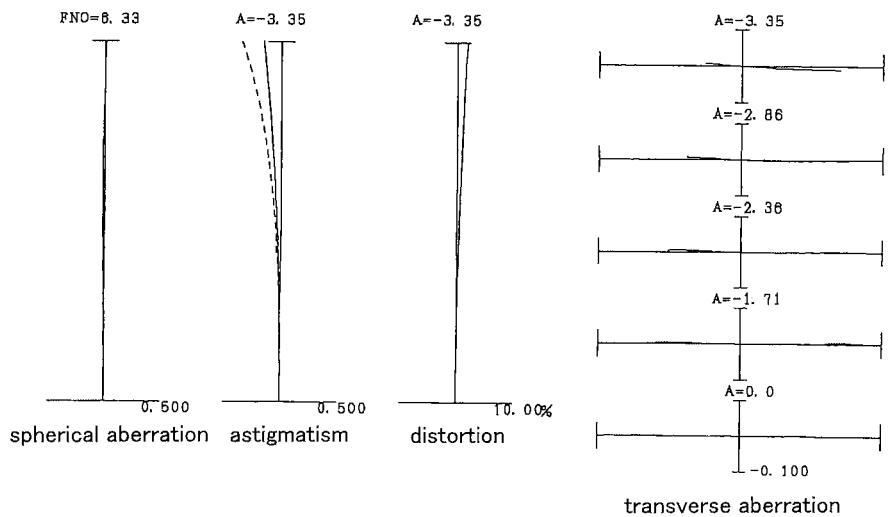

(1) $(-f3n)/\sqrt{(fw \cdot ft)} = 0.952$
(2) $(-f1n)/\sqrt{(fw \cdot ft)} = 0.295$
(3) $(-f2n)/\sqrt{(fw \cdot ft)} = 0.640$
(4) $\beta 1nt/\beta 2nt = -0.705$
(5) $X1n/\sqrt{(fw \cdot ft)} = 0.160$
(6) $f2p/(-f1n) = 1.001$
(7) $X2p/\sqrt{(fw \cdot ft)} = -0.146$
(8) $Bfaw/fw = 0.299$
(9) $2\omega w = 32.316°$
(10) $(\beta 1nt - 1) \cdot \beta Rt = 2.991$
(11) $m12tw/fw = 1.227$
(12) $(-f1n)/f1p = 0.225$
(13) $(-f3n)/f1p = 0.725$
(14) $f2n/f3n = 0.673$
(15) $(RR - RF)/(RR + RF) = 0.319$
(16) $RF/Bfaw = -3.756$ FIG. 6A, FIG. 6B and FIG. 6C are graphs showing various aberrations upon focusing on an infinite distance object, respectively, in the wide angle end state, in the intermediate focal length state and in the telephoto end state, of the variable magnification optical system according to the Third Example.

As is apparent from the respective graphs showing aberrations, the zoom lens system relating to the Third Example can correct superbly various aberrations over the wide angle end state to the telephoto end state and has excellent optical performance.

Fourth Example

Figures 7A, 7B, 7C:
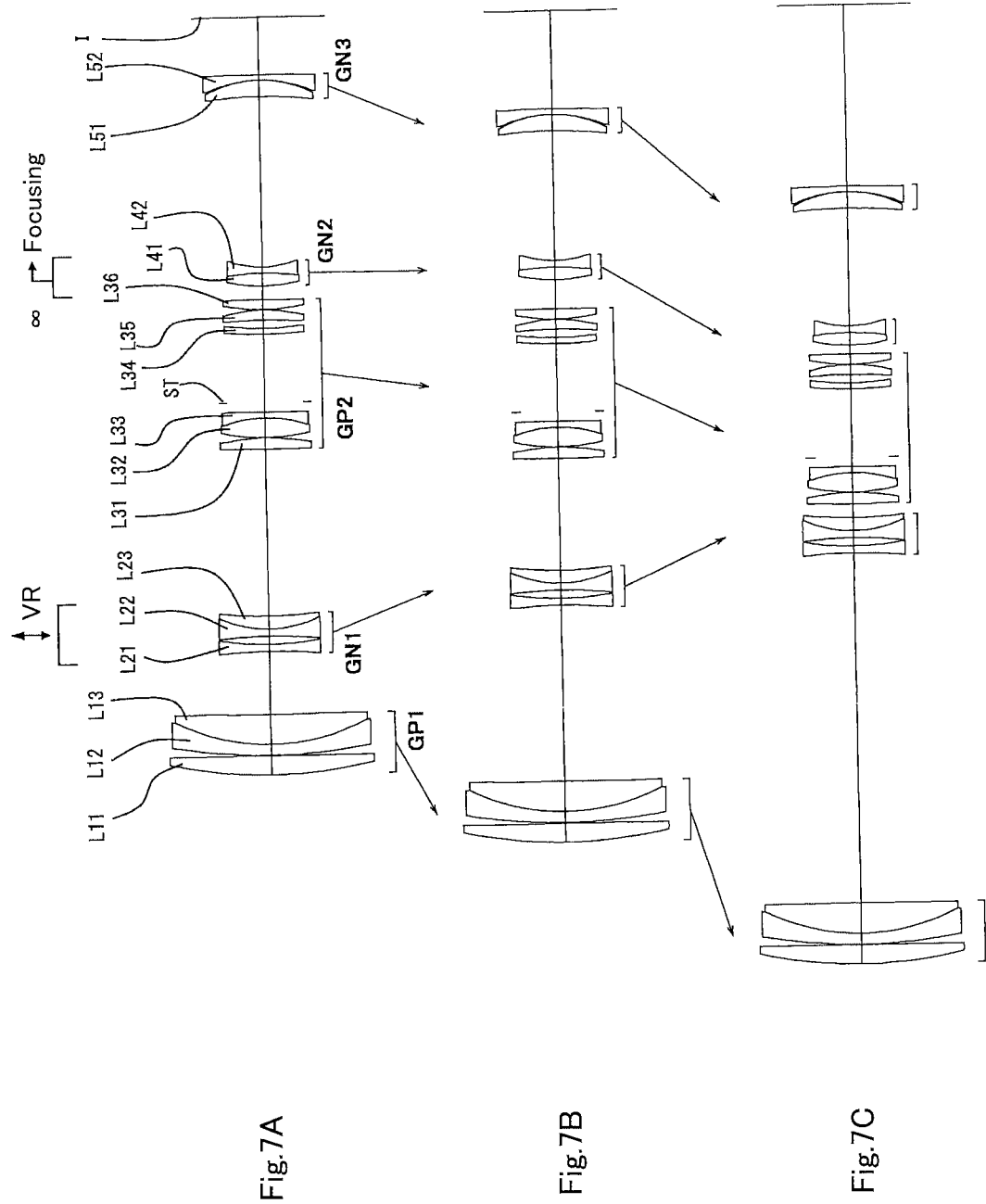
FIG. 7A, FIG. 7B and FIG. 7C are cross sectional views in a wide angle end state, in an intermediate focal length state and in a telephoto end state, respectively, of a variable magnification optical system according to a Fourth Example.

FIG. 7A, FIG. 7B and FIG. 7C are, respectively, cross sectional views in a wide angle end state, in an intermediate focal length state and in a telephoto end state, of a variable magnification optical system according to a Fourth Example.

Arrows below respective lens groups in FIG. 7A show directions of movements of respective lens groups upon varying magnification from the wide angle end state to the intermediate focal length state. Arrows below respective lens groups in FIG. 7B show directions of movements of respective lens groups upon varying magnification from the intermediate focal length state to the telephoto end state.

The variable magnification optical system according to the present Example is composed of, in order from an object side, a first positive lens group GP1 having positive refractive power that is a first lens group, a first negative lens group GN1 having negative refractive power that is a second lens group, a second positive lens group GP2 having positive refractive power that is a third lens group, a second negative lens group GN2 having negative refractive power that is a fourth lens group, and a third negative lens group GN3 having negative refractive power that is a fifth lens group.

The first positive lens group GP1 consists of, in order from the object side, a positive meniscus lens L11 having a convex surface facing the object side, and a cemented positive lens constructed by a negative meniscus lens L12 having a convex surface facing the object side cemented with a positive meniscus lens L13 having a convex surface facing the object side.

The first negative lens group GN1 consists of, in order from the object side, a double concave negative lens L21, and a cemented negative lens constructed by a double concave negative lens L22 cemented with a positive meniscus lens L23 having a convex surface facing the object side.

The second positive lens GP2 consists of, in order from the object side, a double convex positive lens L31, a cemented negative lens constructed by a double convex positive lens L32 cemented with a negative meniscus lens L33 having a concave surface facing the object side, an aperture stop ST, a negative meniscus lens L34 having a convex surface facing the object side, a positive meniscus lens L35 having a concave surface facing the object side and a positive meniscus lens L36 having a convex surface facing the object side.

The second negative lens group GN2 consists of, in order from the object side, a cemented negative lens constructed by a double convex positive lens L41 cemented with a double concave negative lens L42.

The third negative lens group GN3 consists of, in order from the object side, a positive meniscus lens L51 having a concave surface facing the object side, and a negative meniscus lens L52 having a concave surface facing the object side.

On the image plane I, an imaging device (not shown) composed of CCD, CMOS or the like is disposed.

In the variable magnification optical system according to the present Example, as configured above, upon varying magnification from the wide angle end state to the telephoto end state, the first positive lens group GP1, the first negative lens group GN1, the second positive lens group GP2, the second negative lens group GN2 and the third negative lens group GN3 are moved along the optical axis such that a distance between the first positive lens group GP1 and the first negative lens group GN1, a distance between the first negative lens group GN1 and the second positive lens group GP2, a distance between the second positive lens group GP2 and the second negative lens group GN2, and a distance between the second negative lens group GN2 and the third negative lens group GN3, are varied. In detail, the first positive lens group GP1 is moved toward the object side, the first negative lens group GN1 is moved toward the image side, the second positive lens group GP2 is moved toward the object side, the second negative lens group GN2 is moved toward the object side, and the third negative lens group GN3 is moved toward the object side.

In the variable magnification optical system according to the present Example, focusing from an infinite distance object to a close distance object is carried out by moving the second negative lens group GN2 along the optical axis toward the image side.

In the variable magnification optical system according to the present Example, correction of image plane upon image blur being generated, that is, vibration reduction, is carried out by moving the first negative lens group GN1 as a vibration reduction lens group to include a component in a direction perpendicular to the optical axis.

Table 4 below shows various values of the variable magnification optical system relating to the present Example.

TABLE 4

Fourth Example

[Surface Data]

| m | r | d | nd | vd |
|---|---|---|---|---|
| OP | ∞ | | | |
| 1 | 102.02360 | 4.018 | 1.51680 | 64.1 |
| 2 | 23725.55500 | 0.200 | | |
| 3 | 124.20660 | 2.300 | 1.62004 | 36.4 |
| 4 | 46.74590 | 6.448 | 1.48749 | 70.3 |
| 5 | 2520.57410 | D5 | | |
| 6 | −108.36330 | 1.500 | 1.71999 | 50.3 |
| 7 | 67.45060 | 1.732 | | |
| 8 | −93.87760 | 1.500 | 1.78590 | 44.2 |
| 9 | 25.84960 | 2.766 | 1.92286 | 20.9 |
| 10 | 95.38820 | D10 | | |
| 11 | 356.21330 | 2.426 | 1.80610 | 41.0 |
| 12 | −49.97960 | 0.100 | | |
| 13 | 43.50590 | 4.168 | 1.49700 | 81.6 |
| 14 | −29.17280 | 1.300 | 2.00100 | 29.1 |
| 15 | −549.62290 | 2.000 | | |
| 16 | ST | 14.664 | | |
| 17 | 102.25240 | 1.300 | 1.80518 | 25.4 |
| 18 | 61.57290 | 1.785 | | |
| 19 | −112.53220 | 2.112 | 1.74100 | 52.8 |
| 20 | −33.22100 | 0.100 | | |
| 21 | 44.64520 | 2.092 | 1.48749 | 70.3 |
| 22 | 3129.20700 | D22 | | |
| 23 | 36.81260 | 2.689 | 1.79504 | 28.7 |
| 24 | −56.40380 | 1.400 | 1.80440 | 39.6 |
| 25 | 22.49860 | D25 | | |
| 26 | −105.25910 | 3.471 | 1.53172 | 48.8 |
| 27 | −25.72550 | 0.100 | | |
| 28 | −29.26300 | 1.117 | 1.83400 | 37.2 |
| 29 | −519.07190 | D29 | | |
| I | ∞ | | | |

[Various Data]
Variable magnification ratio: 4.72

| | W | M | T |
|---|---|---|---|
| f | 51.51 | 85.02 | 242.99 |
| FNo | 4.56 | 5.08 | 6.30 |
| ω | 15.9 | 9.5 | 3.3 |
| Y | 14.50 | 14.50 | 14.50 |
| TL | 161.982 | 177.717 | 204.877 |
| BF | 12.355 | 21.015 | 38.805 |
| BF (air converted length) | 12.355 | 21.015 | 38.805 |

[Variable Distance Data]

| | W | M | T |
|---|---|---|---|
| D0 | ∞ | ∞ | ∞ |
| MG | — | — | — |
| f | 51.51 | 85.02 | 242.99 |
| D5 | 13.441 | 37.627 | 74.711 |
| D10 | 35.676 | 23.863 | 2.974 |
| D22 | 2.936 | 6.237 | 2.000 |
| D25 | 36.287 | 27.687 | 25.101 |
| D29 | 12.355 | 21.015 | 38.805 |

[Lens Group Data]

| | ST | f |
|---|---|---|
| First Positive Lens Group GP1 | 1 | 142.30 |
| First Negative Lens Group GN1 | 6 | −32.29 |

TABLE 4-continued

Fourth Example

| Second Positive Lens Group GP2 | 11 | 35.53 |
|---|---|---|
| Second Negative Lens Group GN2 | 23 | −79.58 |
| Third Negative Lens Group GN3 | 26 | −88.56 |

[Values for Conditional Expressions]

Figure 8A:
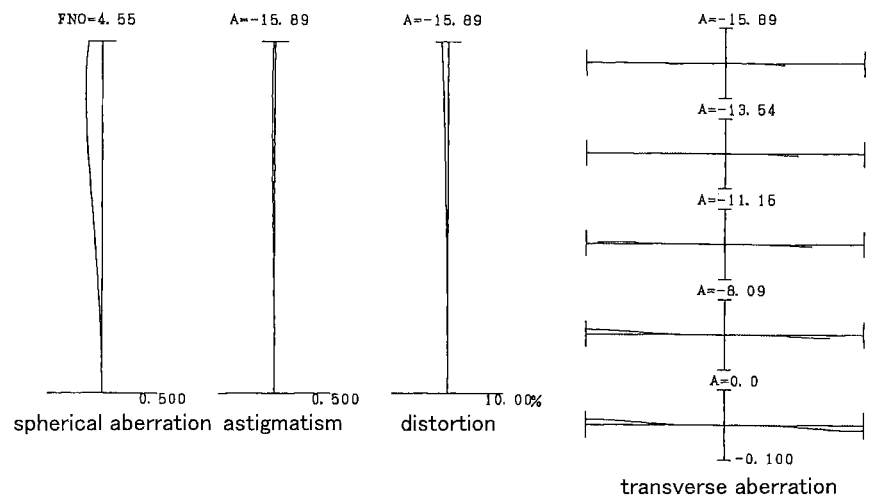
FIG. 8A, FIG. 8B and FIG. 8C are graphs showing various aberrations, upon focusing on an infinite distance object, in the wide angle end state, in the intermediate focal length state, and in the telephoto end state, respectively, of the variable magnification optical system according to the Fourth Example.
Figure 8B:
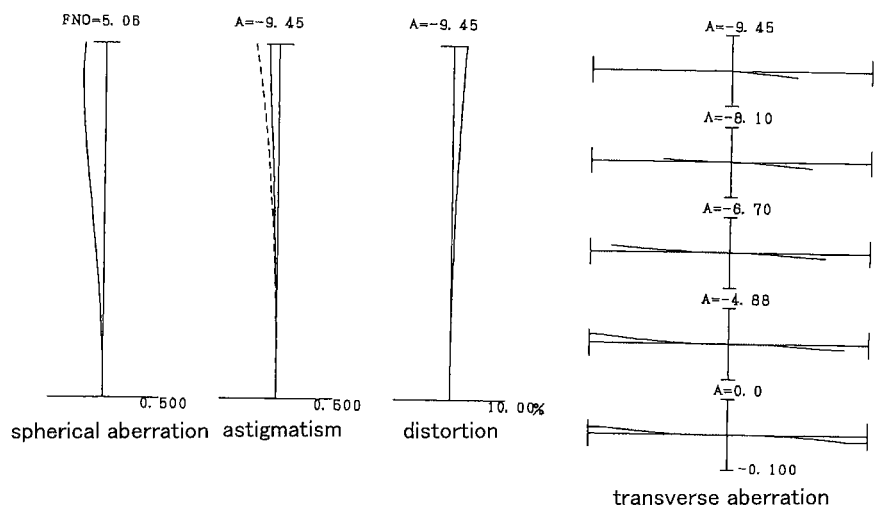
Figure 8C:
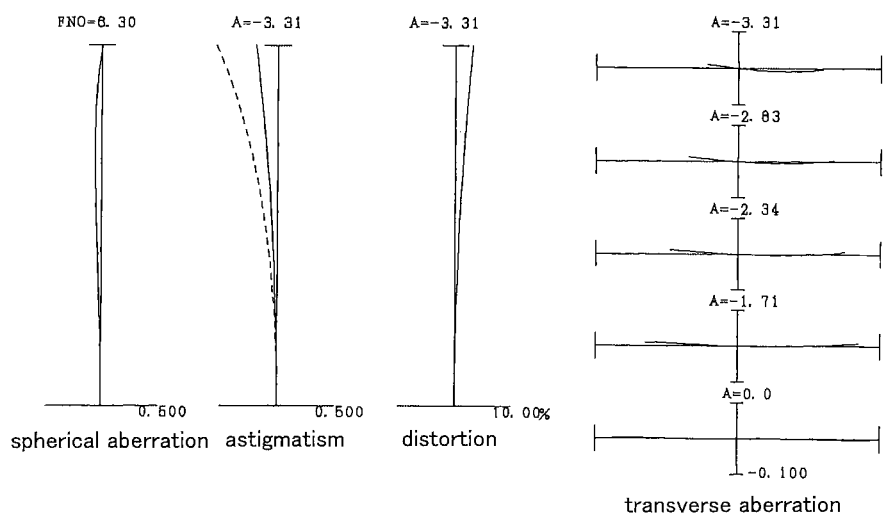

(1) $(-f3n)/\sqrt{(fw*ft)} = 0.792$
(2) $(-f1n)/\sqrt{(fw*ft)} = 0.289$
(3) $(-f2n)/\sqrt{(fw*ft)} = 0.712$
(4) $\beta1nt/\beta2nt = -0.797$
(5) $X1n/\sqrt{(fw*ft)} = 0.164$
(6) $f2p/(-f1n) = 1.100$
(7) $X2p/\sqrt{(fw*ft)} = -0.128$
(8) $Bfaw/fw = 0.240$
(9) $2\omega w = 31.780°$
(10) $(\beta1nt - 1)*\beta Rt = 3.020$
(11) $m12tw/fw = 1.190$
(12) $(-f1n)/f1p = 0.227$
(13) $(-f3n)/f1p = 0.622$
(14) $f2n/f3n = 0.899$
(15) $(RR - RF)/(RR + RF) = 0.663$
(16) $RF/Bfaw = -8.520$ FIG. 8A, FIG. 8B and FIG. 8C are graphs showing various aberrations upon focusing on an infinite distance object, respectively, in the wide angle end state, in the intermediate focal length state and in the telephoto end state, of the variable magnification optical system according to the Fourth Example.

As is apparent from the above-mentioned graphs showing aberrations, the zoom lens system relating to the Fourth Example can correct superbly various aberrations over the wide angle end state to the telephoto end state and has excellent optical performance.

Fifth Example

Figures 9A, 9B, 9C:
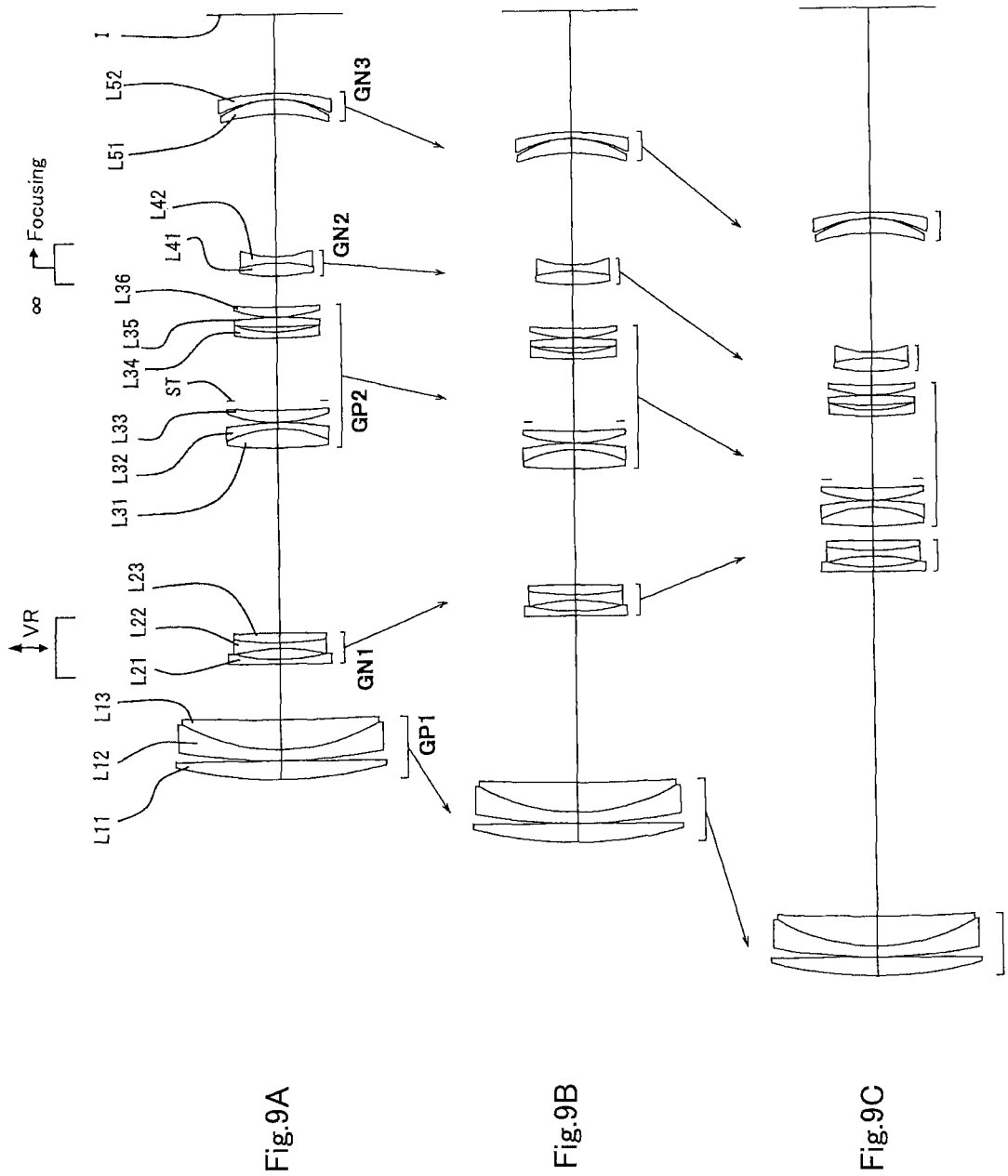
FIG. 9A, FIG. 9B and FIG. 9C are cross sectional views in a wide angle end state, in an intermediate focal length state and in a telephoto end state, respectively, of a variable magnification optical system according to a Fifth Example.

FIG. 9A, FIG. 9B and FIG. 9C are, respectively, cross sectional views in a wide angle end state, in an intermediate focal length state and in a telephoto end state, of a variable magnification optical system according to a Fifth Example.

Arrows below respective lens groups in FIG. 9A show directions of movements of respective lens groups upon varying magnification from the wide angle end state to the intermediate focal length state. Arrows below respective lens groups in FIG. 9B show directions of movements of respective lens groups upon varying magnification from the intermediate focal length state to the telephoto end state.

The variable magnification optical system according to the present Example is composed of, in order from an object side, a first positive lens group GP1 having positive refractive power that is a first lens group, a first negative lens group GN1 having negative refractive power that is a second lens group, a second positive lens group GP2 having positive refractive power that is a third lens group, a second negative lens group GN2 having negative refractive power that is a fourth lens group, and a third negative lens group GN3 having negative refractive power that is a fifth lens group.

The first positive lens group GP1 consists of, in order from the object side, a double convex positive lens L11, and a cemented positive lens constructed by a negative meniscus lens L12 having a convex surface facing the object side cemented with a positive meniscus lens L13 having a convex surface facing the object side.

The first negative lens group GN1 consists of, in order from the object side, a negative meniscus lens L21 having a convex surface facing the object side, and a cemented negative lens constructed by a double concave negative lens L22 cemented with a double convex positive lens L23.

The second positive lens GP2 consists of, in order from the object side, a cemented positive lens constructed by a double convex positive lens L31 cemented with a negative meniscus lens L32 having a concave surface facing the object side, a positive meniscus lens L33 having a convex surface facing the object side, an aperture stop ST, a negative meniscus lens L34 having a convex surface facing the object side, a double convex positive lens L35 and a positive meniscus lens L36 having a convex surface facing the object side.

The second negative lens group GN2 consists of, in order from the object side, a cemented negative lens constructed by a double convex positive lens L41 cemented with a double concave negative lens L42.

The third negative lens group GN3 consists of, in order from the object side, a positive meniscus lens L51 having a concave surface facing the object side, and a negative meniscus lens L52 having a concave surface facing the object side.

On the image plane I, an imaging device (not shown) composed of CCD, CMOS or the like is disposed.

In the variable magnification optical system according to the present Example, as configured above, upon varying magnification from the wide angle end state to the telephoto end state, the first positive lens group GP1, the first negative lens group GN1, the second positive lens group GP2, the second negative lens group GN2 and the third negative lens group GN3 are moved along the optical axis such that a distance between the first positive lens group GP1 and the first negative lens group GN1, a distance between the first negative lens group GN1 and the second positive lens group GP2, a distance between the second positive lens group GP2 and the second negative lens group GN2, and a distance between the second negative lens group GN2 and the third negative lens group GN3, are varied. In detail, the first positive lens group GP1 is moved toward the object side, the first negative lens group GN1 is moved toward the image side, the second positive lens group GP2 is moved toward the object side, the second negative lens group GN2 is moved toward the object side, and the third negative lens group GN3 is moved toward the object side.

In the variable magnification optical system according to the present Example, focusing from an infinite distance object to a close distance object is carried out by moving the second negative lens group GN2 along the optical axis toward the image side.

In the variable magnification optical system according to the present Example, correction of image plane upon image blur being generated, that is, vibration reduction, is carried out by moving the first negative lens group GN1 as a vibration reduction lens group to include a component in a direction perpendicular to the optical axis.

Table 5 below shows various values of the variable magnification optical system relating to the present Example.

TABLE 5

Fifth Example

[Surface Data]

| m | r | d | nd | vd |
|---|---|---|---|---|
| OP | ∞ | | | |
| 1 | 89.51110 | 3.900 | 1.51680 | 64.1 |
| 2 | −6223.14480 | 0.100 | | |
| 3 | 121.42130 | 2.300 | 1.60342 | 38.0 |

TABLE 5-continued

Fifth Example

| 4 | 42.38070 | 6.292 | 1.48749 | 70.3 |
|---|---|---|---|---|
| 5 | 500.00010 | D5 | | |
| 6 | 6605.01980 | 0.980 | 1.77250 | 49.6 |
| 7 | 45.10060 | 2.290 | | |
| 8 | −41.11830 | 1.200 | 1.78590 | 44.2 |
| 9 | 62.10660 | 2.079 | 1.94595 | 18.0 |
| 10 | −284.90000 | D10 | | |
| 11 | 90.49660 | 4.093 | 1.49700 | 81.6 |
| 12 | −25.57740 | 1.300 | 1.85026 | 32.4 |
| 13 | −63.88090 | 0.100 | | |
| 14 | 33.09670 | 2.552 | 1.51680 | 64.1 |
| 15 | 190.90280 | 2.000 | | |
| 16 | ST | 13.262 | | |
| 17 | 81.00000 | 1.300 | 1.71736 | 29.6 |
| 18 | 28.85130 | 1.055 | | |
| 19 | 90.00000 | 2.050 | 1.71999 | 50.3 |
| 20 | −84.72400 | 0.100 | | |
| 21 | 30.60250 | 2.000 | 1.71999 | 50.3 |
| 22 | 101.01010 | D22 | | |
| 23 | 40.74300 | 2.800 | 1.79504 | 28.7 |
| 24 | −34.71910 | 1.300 | 1.80440 | 39.6 |
| 25 | 22.08130 | D25 | | |
| 26 | −38.89500 | 3.054 | 1.61272 | 58.5 |
| 27 | −21.08970 | 0.100 | | |
| 28 | −25.00540 | 1.250 | 1.91082 | 35.2 |
| 29 | −52.25280 | D29 | | |
| I | ∞ | | | |

[Various Data]
Variable magnification ratio: 4.73

| | W | M | T |
|---|---|---|---|
| f | 51.41 | 86.25 | 242.92 |
| FNo | 4.64 | 5.14 | 6.17 |
| ω | 16.1 | 9.4 | 3.3 |
| Y | 14.50 | 14.50 | 14.50 |
| TL | 161.541 | 175.521 | 204.303 |
| BF | 16.655 | 25.663 | 43.155 |
| BF (air converted length) | 16.655 | 25.663 | 43.155 |

[Variable Distance Data]

| | W | M | T |
|---|---|---|---|
| D0 | ∞ | ∞ | ∞ |
| MG | — | — | — |
| f | 51.41 | 86.25 | 242.92 |
| D5 | 11.800 | 35.130 | 72.602 |
| D10 | 39.007 | 24.446 | 3.000 |
| D22 | 6.543 | 9.225 | 3.000 |
| D25 | 30.077 | 23.599 | 25.088 |
| D29 | 16.655 | 25.663 | 43.155 |

[Lens Group Data]

| | ST | f |
|---|---|---|
| First Positive Lens Group GP1 | 1 | 139.16 |
| First Negative Lens Group GN1 | 6 | −32.82 |
| Second Positive Lens Group GP2 | 11 | 34.57 |
| Second Negative Lens Group GN2 | 23 | −64.26 |
| Third Negative Lens Group GN3 | 26 | −196.02 |

[Values for Conditional Expressions]

(1) $(-f3n)/\sqrt{(fw \cdot ft)} = 1.753$
(2) $(-f1n)/\sqrt{(fw \cdot ft)} = 0.293$
(3) $(-f2n)/\sqrt{(fw \cdot ft)} = 0.575$
(4) $\beta 1nt/\beta 2nt = -0.740$
(5) $X1n/\sqrt{(fw \cdot ft)} = 0.161$
(6) $f2p/(-f1n) = 1.054$
(7) $X2p/\sqrt{(fw \cdot ft)} = -0.161$
(8) $Bfaw/fw = 0.324$
(9) $2\omega w = 32.294°$
(10) $(\beta 1nt - 1) \cdot \beta Rt = 2.990$
(11) $m12tw/fw = 1.183$
(12) $(-f1n)/f1p = 0.236$ TABLE 5-continued Fifth Example

(13) (−f3n)/f1p = 1.409
(14) f2n/f3n = 0.328
(15) (RR − RF)/(RR + RF) = 0.147
(16) RF/Bfaw = −2.335

Figure 10A:
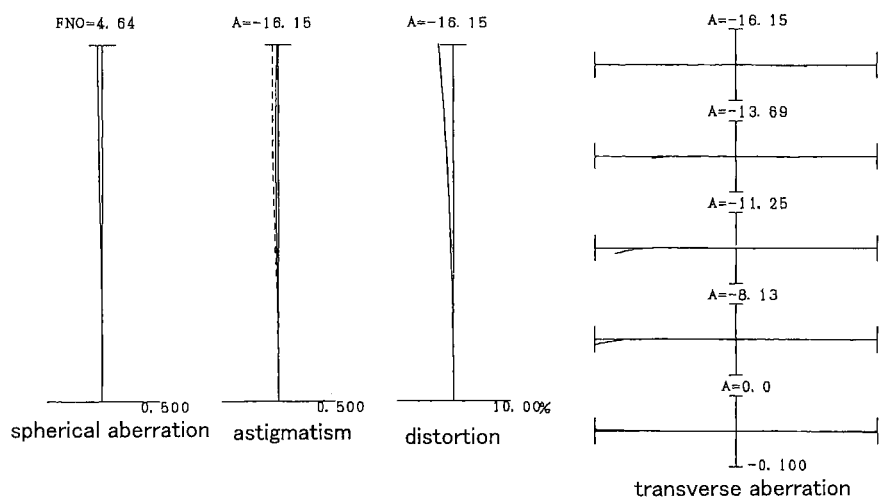
FIG. 10A, FIG. 10B and FIG. 10C are graphs showing various aberrations, upon focusing on an infinite distance object, in the wide angle end state, in the intermediate focal length state, and in the telephoto end state, respectively, of the variable magnification optical system according to the Fifth Example.
Figure 10B:
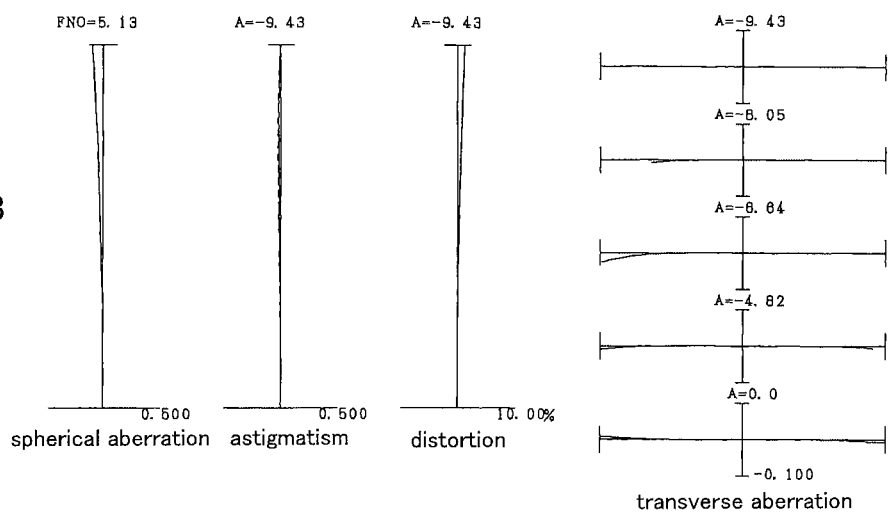
Figure 10C:
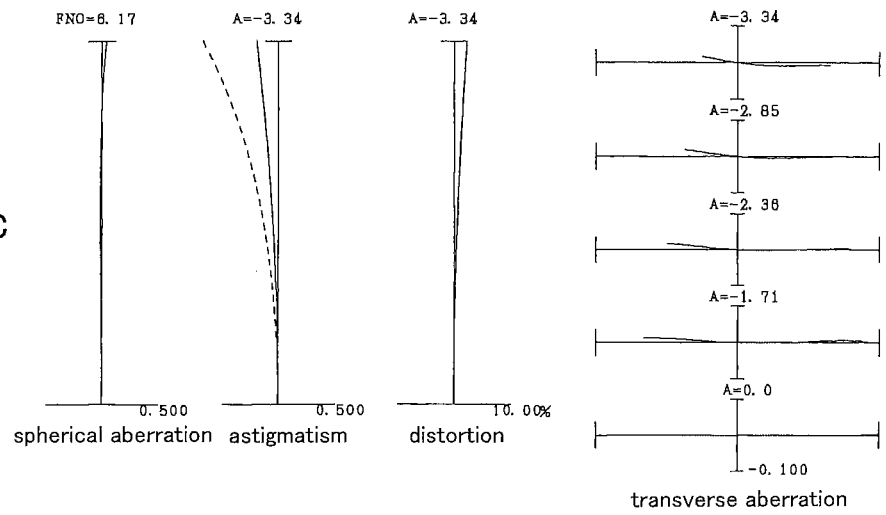

FIG. 10A, FIG. 10B and FIG. 10C are graphs showing various aberrations upon focusing on an infinite distance object, respectively, in the wide angle end state, in the intermediate focal length state and in the telephoto end state, of the variable magnification optical system according to the Fifth Example.

As is apparent from the above-mentioned graphs showing aberrations, the zoom lens system relating to the Fifth Example can correct superbly various aberrations over the wide angle end state to the telephoto end state and has excellent imaging performance.

Sixth Example

Figure 11A:
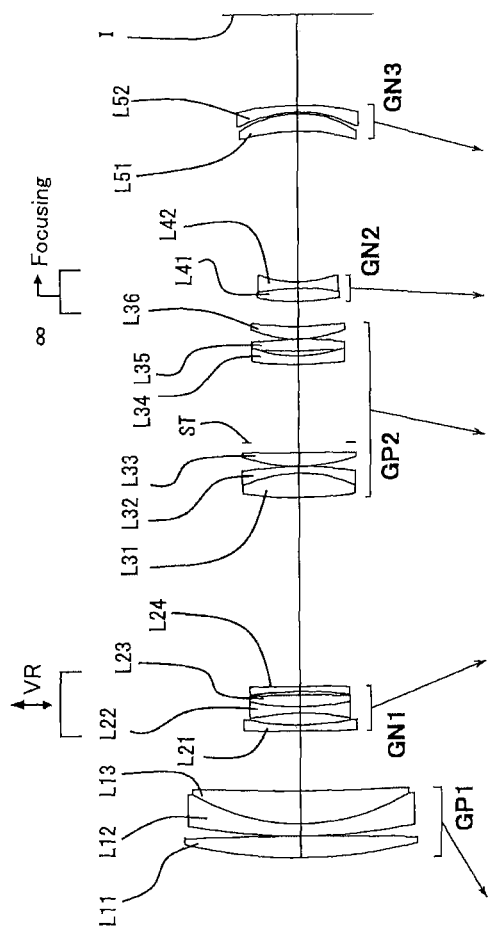
FIG. 11A, FIG. 11B and FIG. 11C are cross sectional views in a wide angle end state, in an intermediate focal length state and in a telephoto end state, respectively, of a variable magnification optical system according to a Sixth Example.
Figure 11B:
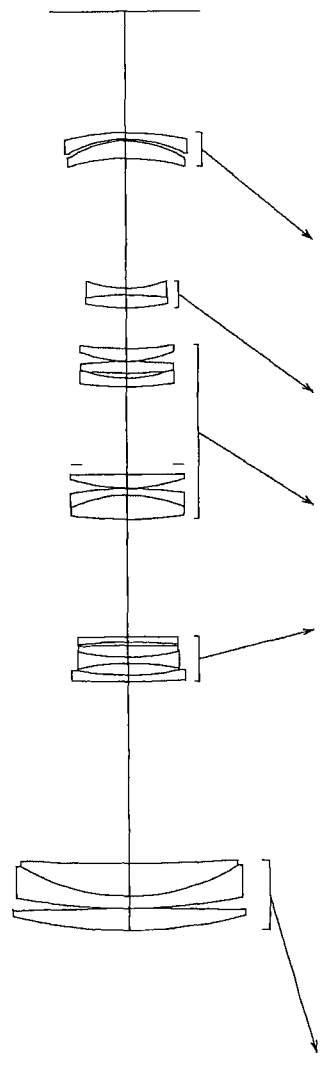
Figure 11C:
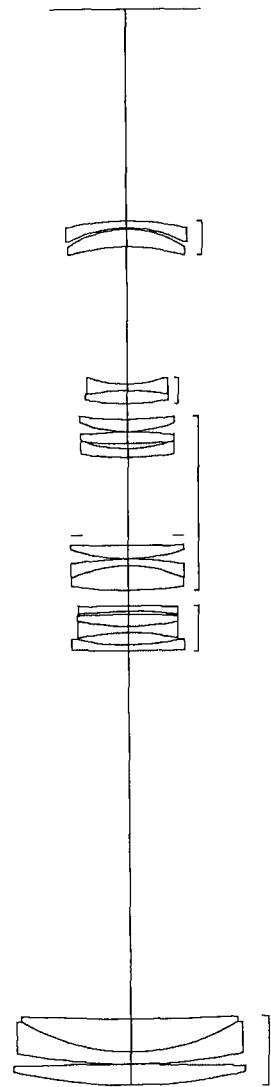

FIG. 11A, FIG. 11B and FIG. 11C are, respectively, cross sectional views in a wide angle end state, in an intermediate focal length state and in a telephoto end state, of a variable magnification optical system according to a Sixth Example. Arrows below respective lens groups in FIG. 11A show directions of movements of respective lens groups upon varying magnification from the wide angle end state to the intermediate focal length state. Arrows below respective lens groups in FIG. 11B show directions of movements of respective lens groups upon varying magnification from the intermediate focal length state to the telephoto end state.

The variable magnification optical system according to the present Example is composed of, in order from an object side, a first positive lens group GP1 having positive refractive power that is a first lens group, a first negative lens group GN1 having negative refractive power that is a second lens group, a second positive lens group GP2 having positive refractive power that is a third lens group, a second negative lens group GN2 having negative refractive power that is a fourth lens group, and a third negative lens group GN3 having negative refractive power that is a fifth lens group.

The first positive lens group GP1 consists of, in order from the object side, a double convex positive lens L11, and a cemented positive lens constructed by a negative meniscus lens L12 having a convex surface facing the object side cemented with a positive meniscus lens L13 having a convex surface facing the object side.

The first negative lens group GN1 consists of, in order from the object side, a negative meniscus lens L21 having a convex surface facing the object side, a cemented negative lens constructed by a double concave negative lens L22 cemented with a double convex positive lens L23, and a negative meniscus lens L24 having a concave surface facing the object side.

The second positive lens GP2 consists of, in order from the object side, a cemented positive lens constructed by a double convex positive lens L31 cemented with a negative meniscus lens L32 having a concave surface facing the object side, a positive meniscus lens L33 having a convex surface facing the object side, an aperture stop ST, a negative meniscus lens L34 having a convex surface facing the object side, a double convex positive lens L35 and a positive meniscus lens L36 having a convex surface facing the object side.

The second negative lens group GN2 consists of, in order from the object side, a cemented negative lens constructed by a double convex positive lens L41 cemented with a double concave negative lens L42.

The third negative lens group GN3 consists of, in order from the object side, a positive meniscus lens L51 having a concave surface facing the object side, and a negative meniscus lens L52 having a concave surface facing the object side.

On the image plane I, an imaging device (not shown) composed of CCD, CMOS or the like is disposed.

In the variable magnification optical system according to the present Example, as configured above, upon varying magnification from the wide angle end state to the telephoto end state, the first positive lens group GP1, the first negative lens group GN1, the second positive lens group GP2, the second negative lens group GN2 and the third negative lens group GN3 are moved along the optical axis such that a distance between the first positive lens group GP1 and the first negative lens group GN1, a distance between the first negative lens group GN1 and the second positive lens group GP2, a distance between the second positive lens group GP2 and the second negative lens group GN2, and a distance between the second negative lens group GN2 and the third negative lens group GN3, are varied. In detail, the first positive lens group GP1 is moved toward the object side, the first negative lens group GN1 is moved toward the image side, the second positive lens group GP2 is moved toward the object side, the second negative lens group GN2 is moved toward the object side, and the third negative lens group GN3 is moved toward the object side.

In the variable magnification optical system according to the present Example, focusing from an infinite distance object to a close distance object is carried out by moving the second negative lens group GN2 along the optical axis toward the image side.

In the variable magnification optical system according to the present Example, correction of image plane upon image blur being generated, that is, vibration reduction, is carried out by moving the first negative lens group GN1 as a vibration reduction lens group to include a component in a direction perpendicular to the optical axis.

Table 6 below shows various values of the variable magnification optical system relating to the present Example.

TABLE 6

Sixth Example

[Surface Data]

| m | r | d | nd | vd |
|---|---|---|---|---|
| OP | ∞ | | | |
| 1 | 93.47132 | 4.090 | 1.51680 | 64.1 |
| 2 | −1133.57750 | 0.100 | | |
| 3 | 117.38090 | 2.300 | 1.60342 | 38.0 |
| 4 | 41.05760 | 6.300 | 1.48749 | 70.3 |
| 5 | 450.00000 | D5 | | |
| 6 | 268.80000 | 1.200 | 1.79952 | 42.1 |
| 7 | 48.94615 | 2.300 | | |
| 8 | −47.17533 | 1.200 | 1.79500 | 45.3 |
| 9 | 47.57821 | 2.220 | 1.94595 | 18.0 |
| 10 | −261.40114 | 0.650 | | |
| 11 | −88.50282 | 1.000 | 1.95375 | 32.3 |
| 12 | −457.30902 | D12 | | |
| 13 | 74.45320 | 4.690 | 1.49700 | 81.6 |
| 14 | −26.85628 | 1.250 | 1.90366 | 31.3 |
| 15 | −70.82707 | 0.100 | | |

TABLE 6-continued

Sixth Example

| | | | | |
|---|---|---|---|---|
| 16 | 34.87737 | 2.530 | 1.56883 | 56.0 |
| 17 | 753.45804 | 2.000 | | |
| 18 | ST | 14.926 | | |
| 19 | 63.90081 | 1.650 | 1.90200 | 25.3 |
| 20 | 26.15260 | 0.955 | | |
| 21 | 85.00000 | 2.210 | 1.74400 | 44.8 |
| 22 | −85.00010 | 0.100 | | |
| 23 | 24.32112 | 2.360 | 1.74400 | 44.8 |
| 24 | 64.74483 | D24 | | |
| 25 | 40.01001 | 2.490 | 1.80518 | 25.4 |
| 26 | −52.73825 | 1.250 | 1.80440 | 39.6 |
| 27 | 21.52211 | D27 | | |
| 28 | −39.08091 | 3.320 | 1.56384 | 60.7 |
| 29 | −20.68916 | 0.320 | | |
| 30 | −24.78916 | 1.250 | 1.91082 | 35.2 |
| 31 | −53.86318 | D31 | | |
| I | ∞ | | | |

[Various Data]
Variable magnification ratio: 4.77

| | W | M | T |
|---|---|---|---|
| f | 51.27 | 86.15 | 244.63 |
| FNo | 4.64 | 5.28 | 6.43 |
| ω | 16.2 | 9.4 | 3.3 |
| Y | 14.50 | 14.50 | 14.50 |
| TL | 161.206 | 175.694 | 205.728 |
| BF | 17.347 | 23.137 | 40.477 |
| BF (air converted length) | 17.347 | 23.137 | 40.477 |

[Variable Distance Data]

| | W | M | T |
|---|---|---|---|
| D0 | ∞ | ∞ | ∞ |
| MG | — | — | — |
| f | 51.27 | 86.15 | 244.63 |
| D5 | 11.400 | 34.720 | 70.201 |
| D12 | 36.081 | 22.431 | 3.000 |
| D24 | 4.763 | 7.799 | 3.000 |
| D27 | 28.854 | 24.848 | 26.290 |
| D31 | 17.347 | 23.137 | 40.477 |

[Lens Group Data]

| | ST | f |
|---|---|---|
| First Positive Lens Group GP1 | 1 | 137.12 |
| First Negative Lens Group GN1 | 6 | −30.39 |
| Second Positive Lens Group GP2 | 13 | 33.93 |
| Second Negative Lens Group GN2 | 25 | −63.78 |
| Third Negative Lens Group GN3 | 28 | −155.58 |

[Values for Conditional Expressions]

Figure 12A:
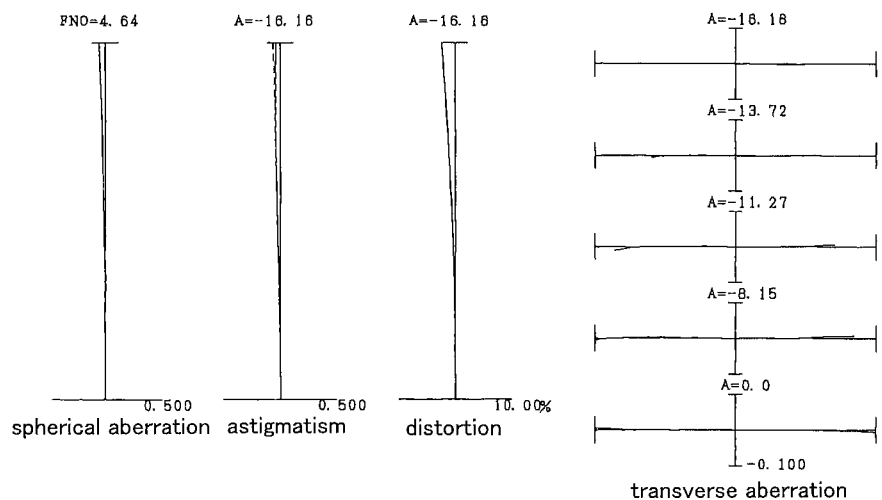
FIG. 12A, FIG. 12B and FIG. 12C are graphs showing various aberrations, upon focusing on an infinite distance object, in the wide angle end state, in the intermediate focal length state, and in the telephoto end state, respectively, of the variable magnification optical system according to the Sixth Example.
Figure 12B:
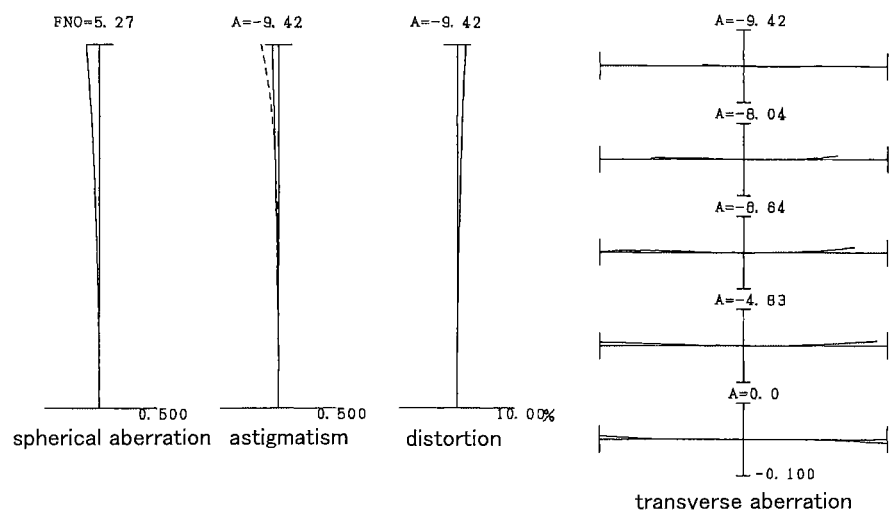
Figure 12C:
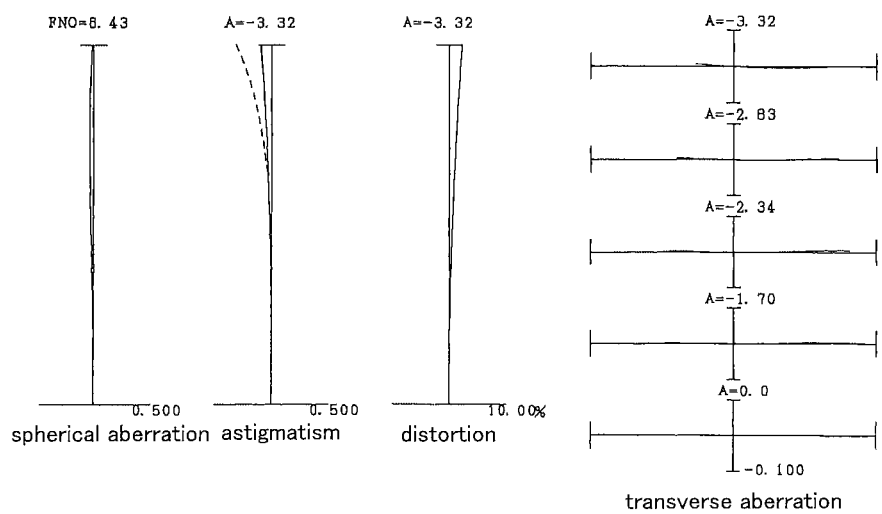

(1) $(-f3n)/\sqrt{(fw*ft)} = 1.391$
(2) $(-f1n)/\sqrt{(fw*ft)} = 0.272$
(3) $(-f2n)/\sqrt{(fw*ft)} = 0.570$
(4) $\beta1nt/\beta2nt = -0.645$
(5) $X1n/\sqrt{(fw*ft)} = 0.128$
(6) $f2p/(-f1n) = 1.117$
(7) $X2p/\sqrt{(fw*ft)} = -0.168$
(8) $Bfaw/fw = 0.338$
(9) $2\omega w = 32.329°$
(10) $(\beta1nt - 1)*\beta Rt = 3.252$
(11) $m12tw/fw = 1.147$
(12) $(-f1n)/f1p = 0.222$
(13) $(-f3n)/f1p = 1.135$
(14) $f2n/f3n = 0.410$
(15) $(RR - RF)/(RR + RF) = 0.159$
(16) $RF/Bfaw = -2.253$ FIG. 12A, FIG. 12B and FIG. 12C are graphs showing various aberrations upon focusing on an infinite distance object, respectively, in the wide angle end state, in the intermediate focal length state and in the telephoto end state, of the variable magnification optical system according to the Sixth Example.

As is apparent from the above-mentioned graphs showing aberrations, the zoom lens system relating to the Sixth Example can correct superbly various aberrations over the wide angle end state to the telephoto end state and has excellent imaging performance.

Seventh Example

Figure 13A:
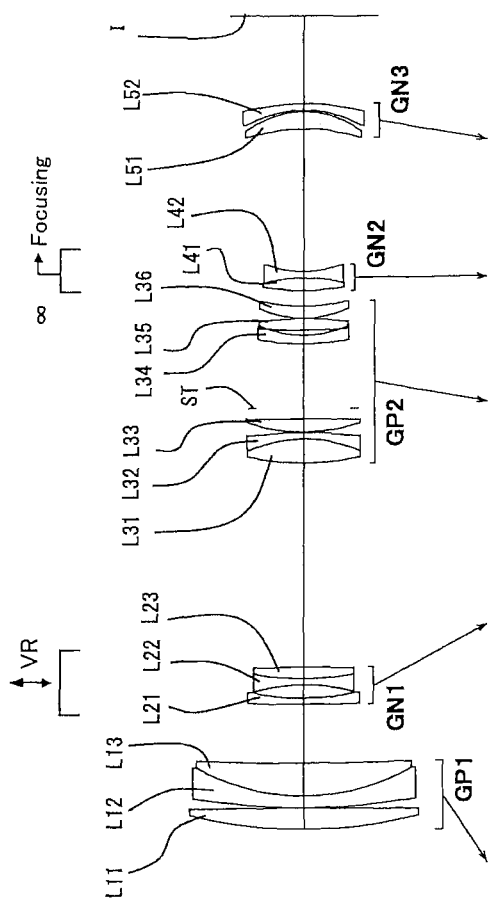
FIG. 13A, FIG. 13B and FIG. 13C are cross sectional views in a wide angle end state, in an intermediate focal length state and in a telephoto end state, respectively, of a variable magnification optical system according to a Seventh Example.
Figure 13B:
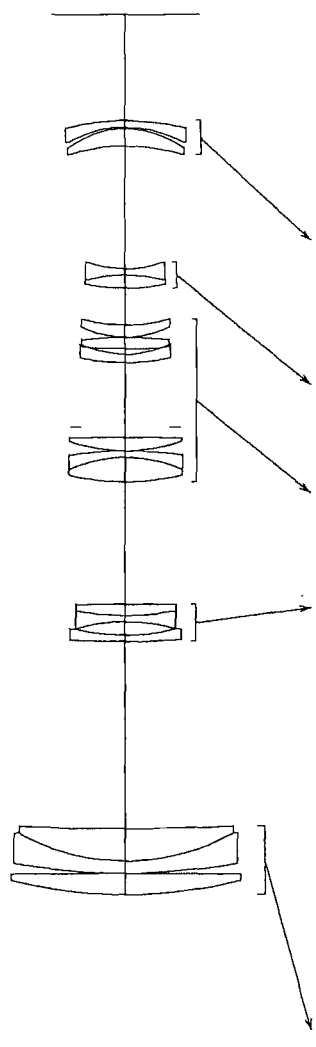
Figure 13C:
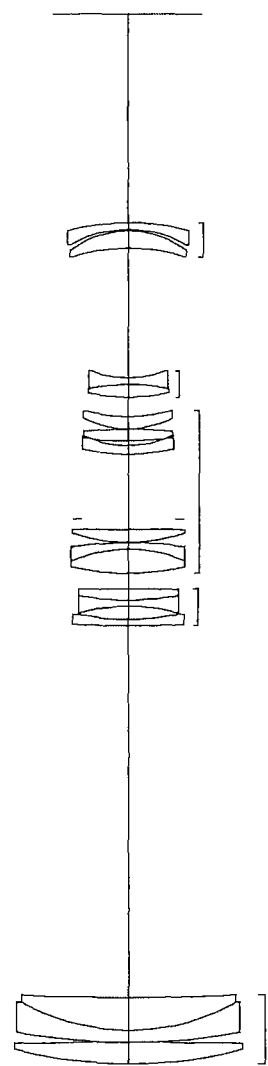

FIG. 13A, FIG. 13B and FIG. 13C are, respectively, cross sectional views in a wide angle end state, in an intermediate focal length state and in a telephoto end state, of a variable magnification optical system according to a Seventh Example. Arrows below respective lens groups in FIG. 13A show directions of movements of respective lens groups upon varying magnification from the wide angle end state to the intermediate focal length state. Arrows below respective lens groups in FIG. 13B show directions of movements of respective lens groups upon varying magnification from the intermediate focal length state to the telephoto end state.

The variable magnification optical system according to the present Example is composed of, in order from an object side, a first positive lens group GP1 having positive refractive power that is a first lens group, a first negative lens group GN1 having negative refractive power that is a second lens group, a second positive lens group GP2 having positive refractive power that is a third lens group, a second negative lens group GN2 having negative refractive power that is a fourth lens group, and a third negative lens group GN3 having negative refractive power that is a fifth lens group.

The first positive lens group GP1 consists of, in order from the object side, a double convex positive lens L11, and a cemented positive lens constructed by a negative meniscus lens L12 having a convex surface facing the object side cemented with a positive meniscus lens L13 having a convex surface facing the object side.

The first negative lens group GN1 consists of, in order from the object side, a negative meniscus lens L21 having a convex surface facing the object side, and a cemented negative lens constructed by a double concave negative lens L22 cemented with a double convex positive lens L23.

The second positive lens group GP2 consists of, in order from the object side, a cemented positive lens constructed by a double convex positive lens L31 cemented with a negative meniscus lens L32 having a concave surface facing the object side, a double convex positive lens L33, an aperture stop ST, a negative meniscus lens L34 having a convex surface facing the object side, a double convex positive lens L35 and a positive meniscus lens L36 having a convex surface facing the object side.

The second negative lens group GN2 consists of, in order from the object side, a cemented negative lens constructed by a double convex positive lens L41 cemented with a double concave negative lens L42.

The third negative lens group GN3 consists of, in order from the object side, a positive meniscus lens L51 having a concave surface facing the object side, and a negative meniscus lens L52 having a concave surface facing the object side.

On the image plane I, an imaging device (not shown) composed of CCD, CMOS or the like is disposed.

In the variable magnification optical system according to the present Example, as configured above, upon varying magnification from the wide angle end state to the telephoto end state, the first positive lens group GP1, the first negative lens group GN1, the second positive lens group GP2, the second negative lens group GN2 and the third negative lens group GN3 are moved along the optical axis such that a distance between the first positive lens group GP1 and the first negative lens group GN1, a distance between the first negative lens group GN1 and the second positive lens group GP2, a distance between the second positive lens group GP2 and the second negative lens group GN2, and a distance between the second negative lens group GN2 and the third negative lens group GN3, are varied. In detail, the first positive lens group GP1 is moved toward the object side, the first negative lens group GN1 is moved toward the image side, the second positive lens group GP2 is moved toward the object side, the second negative lens group GN2 is moved once toward the image side and then moved toward the object side, and the third negative lens group GN3 is moved toward the object side.

In the variable magnification optical system according to the present Example, focusing from an infinite distance object to a close distance object is carried out by moving the second negative lens group GN2 along the optical axis toward the image side.

In the variable magnification optical system according to the present Example, correction of image plane upon image blur being generated, that is, vibration reduction, is carried out by moving the first negative lens group GN1 as a vibration reduction lens group to include a component in a direction perpendicular to the optical axis.

Table 7 below shows various values of the variable magnification optical system relating to the present Example.

TABLE 7

Seventh Example

[Surface Data]

| m | r | d | nd | νd |
|---|---|---|---|---|
| OP | ∞ | | | |
| 1 | 92.46664 | 4.090 | 1.51680 | 64.1 |
| 2 | −1965.97730 | 0.100 | | |
| 3 | 130.30808 | 2.300 | 1.60342 | 38.0 |
| 4 | 43.48647 | 6.300 | 1.48749 | 70.3 |
| 5 | 450.00000 | D5 | | |
| 6 | 268.80354 | 1.200 | 1.77250 | 49.6 |
| 7 | 44.43348 | 2.590 | | |
| 8 | −37.26227 | 1.200 | 1.80610 | 41.0 |
| 9 | 52.74280 | 2.220 | 1.94595 | 18.0 |
| 10 | −328.24497 | D10 | | |
| 11 | 49.79080 | 4.690 | 1.49700 | 81.6 |
| 12 | −28.17550 | 1.250 | 1.90366 | 31.3 |
| 13 | −81.07604 | 0.100 | | |
| 14 | 35.34536 | 2.530 | 1.56883 | 56.0 |
| 15 | −578.67604 | 2.000 | | |
| 16 | ST | 12.554 | | |
| 17 | 44.40415 | 1.650 | 1.90200 | 25.3 |
| 18 | 21.10839 | 0.955 | | |
| 19 | 85.00000 | 2.210 | 1.74400 | 44.8 |
| 20 | −85.00010 | 0.100 | | |
| 21 | 19.81161 | 2.360 | 1.74400 | 44.8 |
| 22 | 33.30793 | D22 | | |
| 23 | 38.31794 | 2.490 | 1.80518 | 25.4 |
| 24 | −34.14118 | 1.250 | 1.80440 | 39.6 |
| 25 | 20.46917 | D25 | | |
| 26 | −37.68147 | 3.320 | 1.56384 | 60.7 |
| 27 | −19.16939 | 0.320 | | |
| 28 | −23.26939 | 1.250 | 1.91082 | 35.2 |
| 29 | −48.50735 | D29 | | |
| I | ∞ | | | |

TABLE 7-continued

Seventh Example

[Various Data]
Variable magnification ratio: 4.77

| | W | M | T |
|---|---|---|---|
| f | 51.25 | 86.18 | 244.50 |
| FNo | 4.64 | 5.26 | 6.42 |
| ω | 16.3 | 9.4 | 3.3 |
| Y | 14.50 | 14.50 | 14.50 |
| TL | 157.670 | 170.584 | 203.302 |
| BF | 17.052 | 20.583 | 40.472 |
| BF (air converted length) | 17.052 | 20.583 | 40.472 |

[Variable Distance Data]

| | W | M | T |
|---|---|---|---|
| D0 | ∞ | ∞ | ∞ |
| MG | — | — | — |
| f | 51.25 | 86.18 | 244.50 |
| D5 | 11.400 | 36.275 | 71.915 |
| D10 | 39.608 | 23.775 | 3.000 |
| D22 | 3.000 | 7.122 | 3.754 |
| D25 | 27.581 | 23.800 | 25.132 |
| D29 | 17.052 | 20.583 | 40.472 |

[Lens Group Data]

| | ST | f |
|---|---|---|
| First Positive Lens Group GP1 | 1 | 146.90 |
| First Negative Lens Group GN1 | 6 | −32.36 |
| Second Positive Lens Group GP2 | 11 | 33.16 |
| Second Negative Lens Group GN2 | 23 | −60.42 |
| Third Negative Lens Group GN3 | 26 | −191.47 |

[Values for Conditional Expressions]

Figure 14A:
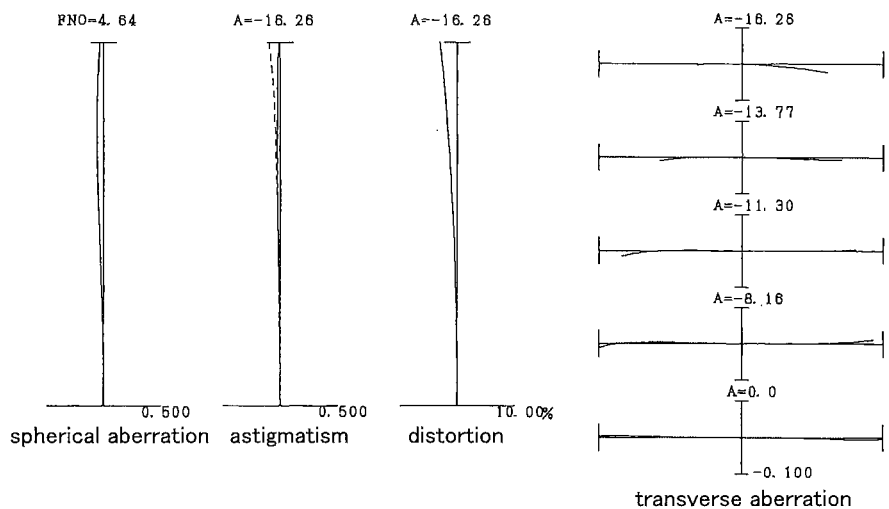
FIG. 14A, FIG. 14B and FIG. 14C are graphs are graphs showing various aberrations, upon focusing on an infinite distance object, in the wide angle end state, in the intermediate focal length state and in the telephoto end state, respectively, of the variable magnification optical system according to the Seventh Example
Figure 14B:
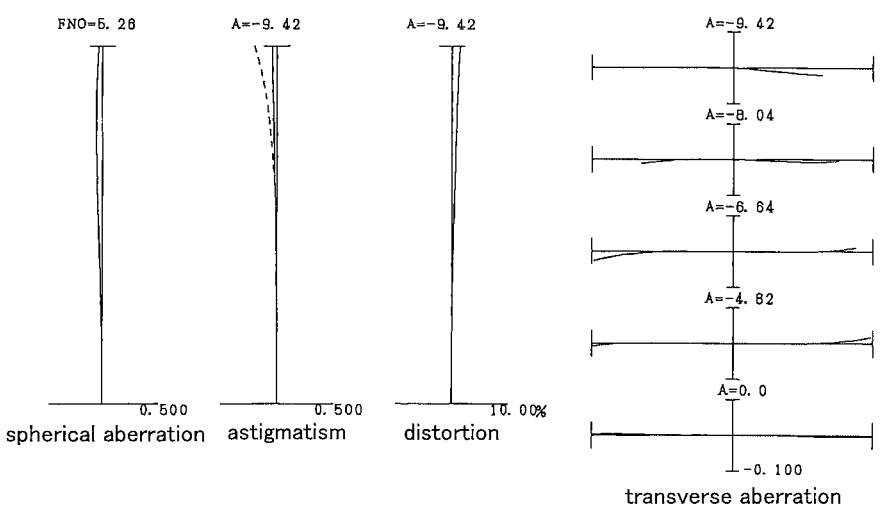
Figure 14C:
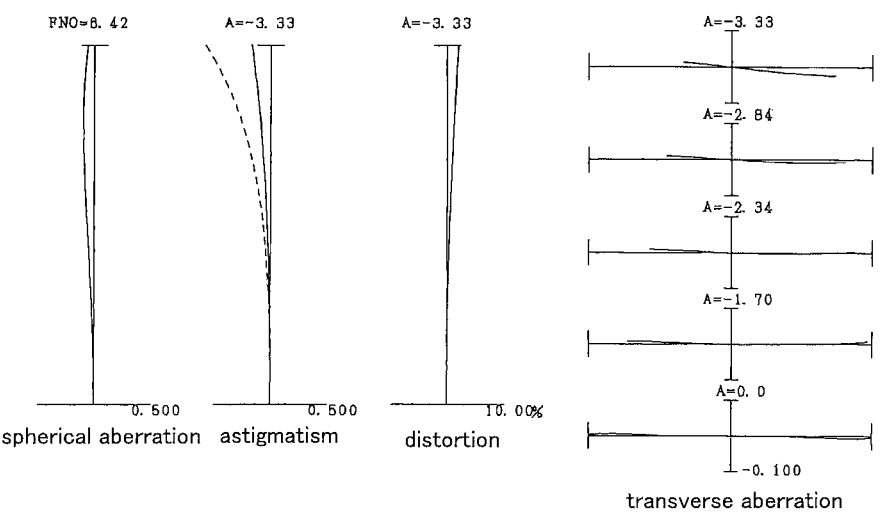

(1) $(-f3n)/\sqrt{(fw*ft)} = 1.712$
(2) $(-f1n)/\sqrt{(fw*ft)} = 0.289$
(3) $(-f2n)/\sqrt{(fw*ft)} = 0.540$
(4) $\beta 1nt/\beta 2nt = -0.533$
(5) $X1n/\sqrt{(fw*ft)} = 0.133$
(6) $f2p/(-f1n) = 1.025$
(7) $X2p/\sqrt{(fw*ft)} = -0.194$
(8) $Bfaw/fw = 0.333$
(9) $2\omega w = 32.519°$
(10) $(\beta 1nt - 1)*\beta Rt = 3.280$
(11) $m12tw/fw = 1.181$
(12) $(-f1n)/f1p = 0.220$
(13) $(-f3n)/f1p = 1.303$
(14) $f2n/f3n = 0.316$
(15) $(RR - RF)/(RR + RF) = 0.126$
(16) $RF/Bfaw = -2.210$ FIG. 14A, FIG. 14B and FIG. 14C are graphs showing various aberrations upon focusing on an infinite distance object, respectively, in the wide angle end state, in the intermediate focal length state and in the telephoto end state, of the variable magnification optical system according to the Seventh Example.

As is apparent from the above-mentioned graphs showing aberrations, the zoom lens system relating to the Seventh Example can correct superbly various aberrations over the wide angle end state to the telephoto end state and has excellent imaging performance.

According to the above described respective examples, it is possible to realize a variable magnification optical system which has high optical performance in that various aberrations can be corrected superbly over the wide angle end state to the telephoto end state, and further of which a vibration reduction lens system is made small in size.

Meanwhile, each of the above described Examples is a concrete example of the invention of the present application, and the invention of the present application is not limited to the above described Examples. The contents described below can be adopted without deteriorating optical performance of the variable magnification optical systems according to the present embodiment.

Meanwhile, in the variable magnification optical system of the invention of the present application, a 35 mm-size equivalent focal length in the wide angle end state is on the order of 50 to 70 mm, and a variable magnification ratio of the present application is on the order of 2.7 times to 6 times. Further, in the variable magnification optical system of the present application, an F-number in the wide angle end state is on the order of f/3.5 to f/4.5, and the F-number in the telephoto end state is on the order of f/5.6 to f/7.0.

Although the variable magnification optical systems having a five group configuration were illustrated above as numerical examples of the variable magnification optical systems according to the present embodiment, the present embodiment is not limited to them and variable magnification optical systems having other configurations, such as six group configuration, or the like, can be configured. Concretely, a configuration that a lens or a lens group is added to the most object side or to the most image side of the variable magnification optical system according to each of the above described Examples is possible. Alternatively, a lens or a lens group may be added between the adjacent lens groups. Meanwhile, a lens group may be composed of at least one lens.

Further, in each of the above described Examples, the second negative lens group is adopted as a focusing lens group. Auto focusing can be applied for such focusing group(s), and drive by motor for auto focusing, such as, ultrasonic motor, stepping motor, or VCM motor may be suitably adopted.

Further, in each of the above described Examples, the first negative lens group is adopted as a vibration reduction lens group, but any lens group in the entirety thereof or a portion thereof can be moved in a direction including a component perpendicular to the optical axis as a vibration reduction lens group, or rotationally moved (swayed) in an in-plane direction including the optical axis, whereby a configuration for conducting a vibration reduction can be taken.

Further, in the variable magnification optical systems according to each of the above described Examples, it is preferable that the aperture stop is disposed in the second positive lens group, but the function may be substituted by a lens frame without disposing a member as an aperture stop.

Further, in the variable magnification optical systems according to each of the above described Examples, a lens surface of a lens may be a spherical surface, a plane surface, or an aspherical surface. When a lens surface is a spherical surface or a plane surface, lens processing, assembling and adjustment become easy, and it is possible to prevent deterioration in optical performance caused by lens processing, assembling and adjustment errors, so that it is preferable. Moreover, even if an image plane is shifted, deterioration in depiction performance is little, so that it is preferable. When a lens surface is an aspherical surface, the aspherical surface may be fabricated by a grinding process, a glass molding process that a glass material is formed into an aspherical shape by a mold, or a compound type process that a resin material is formed into an aspherical shape on a glass lens surface. A lens surface may be a diffractive optical surface, and a lens may be a graded-index type lens (GRIN lens) or a plastic lens.

Further, the lens surface(s) of the lenses configuring the variable magnification optical systems according to the above described respective Examples, may be coated with anti-reflection coating(s) having a high transmittance in a wide wavelength region. With this contrivance, it is feasible to reduce a flare as well as ghost and attain excellent optical performance with high contrast.

Next, a camera equipped with the variable magnification optical system according to the present embodiment, will be explained with referring to FIG. 15.

Figure 15:
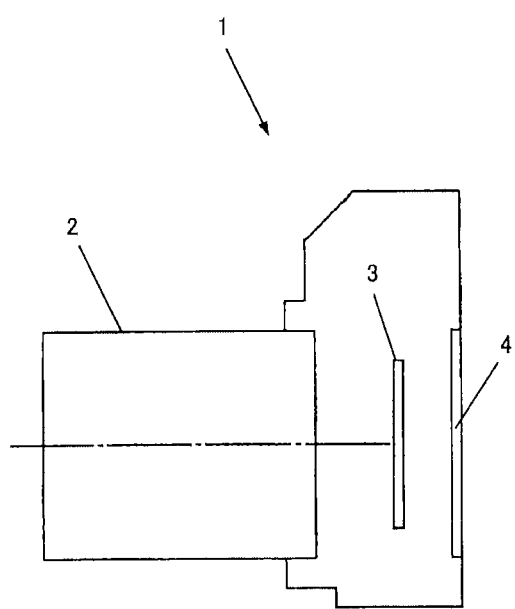
FIG. 15 is a view showing a configuration of a camera equipped with the variable magnification optical system.

FIG. 15 is a view showing a configuration of the camera equipped with the variable magnification optical system according to the present embodiment.

The camera 1 as shown in FIG. 15, is a so-called mirror-less camera of a lens interchangeable type equipped with the variable magnification optical system according to the first Example as an imaging lens 2.

In the present camera 1, a light emitted from an unillustrated object (an object to be photo-taken) is converged by the imaging lens 2, through an unillustrated OLPF (Optical low pass filter), and forms an image of the object on an imaging plane of an image pick-up portion 3. The light from the object is photo-electrically converted through a photo-electric conversion element provided on the image pick-up portion 3 to form a picture image of the object. This picture image is displayed on an EVF (electric view finder) 4 provided on the camera 1. Accordingly, a photographer can observe the object to be photo-taken through the EVF 4.

Further, upon unillustrated release button being depressed by the photographer, the picture image of the object formed by the image pick-up portion 3 is stored in an unillustrated memory. Thus, the photographer can take a photo of the object by the present camera 1.

It is noted here that the variable magnification optical system relating to the First Example in which the present camera 1 is equipped with the imaging lens 2, has superb optical performance as described above in that various aberrations can be corrected superbly over the wide angle end state to the telephoto end state, and further of which a vibration reduction lens system is made small in size. That is, the present camera 1 can have high optical performance in that various aberrations can be corrected superbly and can realize a small-sized vibration reduction group. Incidentally, when there is configured a camera in which the variable magnification optical system according to any of the before-mentioned Second to Seventh Examples is installed as the imaging lens 2, the camera also can attain the same effects as those of the above-mentioned camera 1. Further, even when the variable magnification optical system according to any of the Examples is installed in a camera of a single lens reflex type equipped with a quick return mirror in which the object image is observed through a finder optical system, the camera also can attain the same effects as those of the above-mentioned camera 1.

Figure 16:
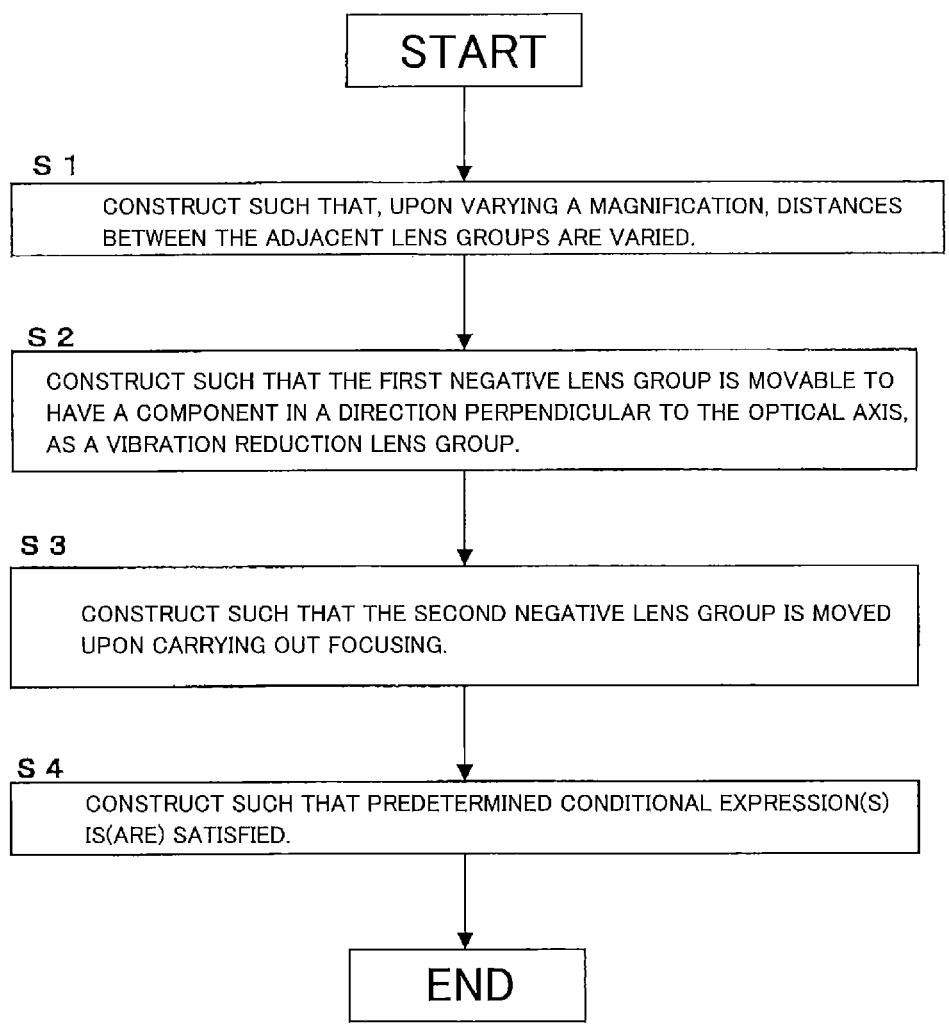
FIG. 16 is a flowchart schematically showing a method for manufacturing the variable magnification optical system.

Next, an outline of a method for manufacturing the variable magnification optical system according to the present embodiment, is described with referring to FIG. 16.

FIG. 16 is a flowchart schematically showing a method for manufacturing the variable magnification optical system according to the present embodiment.

The method for manufacturing the variable magnification optical system according to the present embodiment shown in FIG. 16, is a method for manufacturing a variable magnification optical system which comprises a plurality of lens groups including a first negative lens group having negative refractive power, a second negative lens group disposed at a more image side than the first negative lens group and having negative refractive power, and a third negative lens group disposed at a more image side than the second negative lens group and having negative refractive power, and the method comprising the following steps S1 to S4:

Step S1: constructing such that, upon varying magnification, distances between the adjacent lens groups are varied.

Step S2: constructing such that the first negative lens group is movable to include a component in a direction perpendicular to the optical axis, as a vibration reduction lens group.

Step S3: constructing such that the second negative lens group is moved upon carrying out focusing.

Step S4: constructing such that the following conditional expression (1) is satisfied:

$$0.500 < (-f3n)/\sqrt{(fw*ft)} < 2.500 \quad (1)$$

where f3n denotes a focal length of the third negative lens group, fw denotes a focal length of the variable magnification optical system as a whole in a wide angle end state, and ft denotes a focal length of the variable magnification optical system as a whole in a telephoto end state.

According to the above-stated method for manufacturing the variable magnification optical system according to the present embodiment, it is possible to realize a variable magnification optical system which can attain high optical performances that various aberrations can be corrected well and of which a vibration reduction lens group is made small in size.

EXPLANATION OF REFERENCE SYMBOLS

GP1 First Positive Lens Group
GN1 First Negative Lens Group
GP2 Second Positive Lens Group
GN2 Second Negative Lens Group
GN3 Third Negative Lens Group
ST aperture stop
I image plane
1 camera
2 imaging lens

What is claimed is:

1. A variable magnification optical system comprising a plurality of lens groups which include a first negative lens group having negative refractive power, a second negative lens group disposed at a more image side than the first negative lens group and having negative refractive power, and a third negative lens group disposed at a more image side than the second negative lens group and having negative refractive power;
   upon varying a magnification, distances between adjacent lens groups being varied;
   the second negative lens group being moved along the optical axis upon carrying out focusing, and
   the following conditional expressions being satisfied:

$$0.500 < (-f3n)/\sqrt{(fw*ft)} < 2.500$$

$$0.150 < Bfaw/fw < 0.500$$

where f3n denotes a focal length of the third negative lens group, fw denotes a focal length of the variable magnification optical system as a whole in a wide angle end state, ft denotes a focal length of the variable magnification optical system as a whole in a telephoto end state, and Bfaw denotes an air converted back focus of the variable magnification optical system as a whole in the wide angle end state.

2. A variable magnification optical system according to claim 1, wherein the following conditional expression is satisfied:

$$0.200 < (-f1n)/\sqrt{(fw*ft)} < 0.400$$

where f1n denotes a focal length of the first negative lens group, fw denotes the focal length of the variable magnification optical system as a whole in the wide angle end state, and ft denotes the focal length of the variable magnification optical system as a whole in the telephoto end state.

3. A variable magnification optical system according to claim 1, wherein the following conditional expression is satisfied:

$$0.200 < (-f2n)/\sqrt{(fw*ft)} < 1.000$$

where f2n denotes a focal length of the second negative lens group, fw denotes the focal length of the variable magnification optical system as a whole in the wide angle end state, and ft denotes the focal length of the variable magnification optical system as a whole in the telephoto end state.

4. A variable magnification optical system according to claim 1, wherein the following conditional expression is satisfied:

$$-1.000 < \beta1nt/\beta2\ 2nt < -0.300$$

where $\beta1nt$ denotes a transverse magnification of the first negative lens group in the telephoto end state, and $\beta2nt$ denotes a transverse magnification of the second negative lens group in the telephoto end state.

5. A variable magnification optical system according to claim 1, wherein the following conditional expression is satisfied:

$$0.050 < X1n/\sqrt{(fw*ft)} < 0.250$$

where X1n denotes an amount of movement of the first negative lens group at the time of varying magnification from a wide angle end state to a telephoto end state, assuming that a direction of the movement toward the image side is positive, fw denotes the focal length of the variable magnification optical system as a whole in the wide angle end state, and ft denotes the focal length of the variable magnification optical system as a whole in the telephoto end state.

6. A variable magnification optical system according to claim 1, wherein the first negative lens group includes, in order from the object side, a first negative lens, a second negative lens and a positive lens.

7. A variable magnification optical system according to claim 1, wherein the second negative lens group includes, in order from the object side, a positive lens and a negative lens.

8. A variable magnification optical system according to claim 1, wherein the third negative lens group is disposed at a most image side.

9. A variable magnification optical system according to claim 1, wherein an aperture stop is disposed between the first negative lens group and the second negative lens group.

10. A variable magnification optical system according to claim 1, comprising, in order from the object side, a first positive lens group having positive refractive power, the first negative lens group, a second positive lens group having positive refractive power, the second negative lens group and the third negative lens group.

11. A variable magnification optical system according to claim 1, comprising, in order from the object side, a first positive lens group having positive refractive power, the first negative lens group, a second positive lens group having positive refractive power, the second negative lens group and the third negative lens group, and satisfying the following conditional expression:

$$0.500 < f2p/(-f1n) < 1.500$$

where f2p denotes a focal length of the second positive lens group, and f1n denotes a focal length of the first negative lens group.

12. A variable magnification optical system according to claim 1, comprising, in order from the object side, a first positive lens group having positive refractive power, the first negative lens group, a second positive lens group having positive refractive power, the second negative lens group and the third negative lens group, and satisfying the following conditional expression:

$$-0.300 < X2p/(fw*ft) < 0.000$$

where X2p denotes an amount of movement of the second positive lens group upon varying the magnification from the wide angle end state to the telephoto end state, assuming that a direction of the movement toward the image side is positive, fw denotes the focal length of the variable magnification optical system as a whole in the wide angle end state, and ft denotes the focal length of the variable magnification optical system as a whole in the telephoto end state.

13. A variable magnification optical system according to claim 1, comprising, in order from the object side, a first positive lens group having positive refractive power, the first negative lens group, a second positive lens group having positive refractive power, the second negative lens group and the third negative lens group, wherein, upon varying the magnification, the first positive lens group is moved.

14. A variable magnification optical system according to claim 1, wherein the following conditional expression is satisfied:

$$20.000° < 2\omega w < 45.000°$$

where 2ωw denotes a total angle of view of the variable magnification optical system in a wide angle end state.

15. A variable magnification optical system according to claim 1, wherein the following conditional expression is satisfied:

$$1.500 < (\beta 1nt-1)*\beta Rt < 4.500$$

where β1nt denotes a transverse magnification of the first negative lens group in the telephoto end state, and βRt denotes a composite transverse magnification of all lens groups disposed at a more image side than the first negative lens group in the telephoto end state.

16. A variable magnification optical system according to claim 1, comprising, in order from the object side, a first positive lens group having positive refractive power, the first negative lens group, a second positive lens group having positive refractive power, the second negative lens group and the third negative lens group, wherein the following conditional expression is satisfied:

$$0.500 < m12tw/fw < 2.000$$

where m12tw denotes an amount of change of a distance between the first positive lens group and the first negative lens group upon varying the magnification from the wide angle end state to the telephoto end state, and fw denotes the focal length of the variable magnification optical system as a whole in the wide angle end state.

17. A variable magnification optical system according to claim 1, comprising, in order from the object side, a first positive lens group having positive refractive power, the first negative lens group, a second positive lens group having positive refractive power, the second negative lens group and the third negative lens group, wherein the following conditional expression is satisfied:

$$0.150 < (-f1n)/f1p < 0.350$$

where f1n denotes a focal length of the first negative lens group, and f1p denotes a focal length of the first positive lens group.

18. A variable magnification optical system according to claim 1, comprising, in order from the object side, a first positive lens group having positive refractive power, the first negative lens group, a second positive lens group having positive refractive power, the second negative lens group, and a third negative lens group, wherein the following conditional expression is satisfied:

$$0.010 < (-f3n)/f1p < 3.000$$

where f3n denotes a focal length of the third negative lens group, and f1p denotes a focal length of the first positive lens group.

19. A variable magnification optical system according to claim 1, comprising, in order from the object side, a first positive lens group having positive refractive power, the first negative lens group, a second positive lens group having positive refractive power, the second negative lens group and the third negative lens group, wherein the following conditional expression is satisfied:

$$0.050 < f2n/f3n < 1.500$$

where f2n denotes a focal length of the second negative lens group, and f3n denotes the focal length of the third negative lens group.

20. A variable magnification optical system according to claim 1, comprising, in order from the object side, a first positive lens group having positive refractive power, the first negative lens group, a second positive lens group having positive refractive power, the second negative lens group and the third negative lens group, wherein the following conditional expression is satisfied:

$$0.080 < (RR-RF)/(RR+RF) < 1.000$$

where RR denotes a radius of curvature of a most image side lens surface of the third negative lens group, and RF denotes a radius of curvature of a most object side lens surface of the third negative lens group.

21. A variable magnification optical system according to claim 1, comprising, in order from the object side, a first positive lens group having positive refractive power, the first negative lens group, a second positive lens group having positive refractive power, the second negative lens group and the third negative lens group, wherein the following conditional expression is satisfied:

$$-10.000 < RF/Bfaw < -1.500$$

where RF denotes a radius of curvature of a most object side lens surface of the third negative lens group, and Bfaw denotes an air converted back focus of the variable magnification optical system as a whole in the wide angle end state.

22. An optical equipment comprising a variable magnification optical system according to claim 1.

23. A variable magnification optical system comprising a plurality of lens groups which include, in order from an object side, a first positive lens group having positive refractive power, a first negative lens group having negative refractive power, a second negative lens group disposed at a more image side than the first negative lens group and having negative refractive power, and a third negative lens group disposed at a more image side than the second negative lens group and having negative refractive power;

upon varying a magnification, distances between adjacent lens groups being varied;

the first negative lens group being movable with a movement component in a direction perpendicular to the optical axis as a vibration reduction lens group;

the second negative lens group being moved along the optical axis upon carrying out focusing; and the following conditional expressions being satisfied:

$$0.010<(-f3n)/f1p<3.000$$

$$0.150<Bfaw/fw<0.500$$

where f3n denotes a focal length of the third negative lens group, f1p denotes a focal length of the first positive lens group, Bfaw denotes an air converted back focus of the variable magnification optical system as a whole in the wide angle end state, and fw denotes a focal length of the variable magnification optical system as a whole in a wide angle end state.

24. A variable magnification optical system according to claim 23, wherein the following conditional expression is satisfied:

$$0.200<(-f1n)/\sqrt{(fw*ft)}<0.400$$

where f1n denotes a focal length of the first negative lens group, and ft denotes the focal length of the variable magnification optical system as a whole in the telephoto end state.

25. A variable magnification optical system according to claim 23, wherein the following conditional expression is satisfied:

$$0.200<(-f2n)/\sqrt{(fw*ft)}<1.000$$

where f2n denotes a focal length of the second negative lens group, and ft denotes the focal length of the variable magnification optical system as a whole in the telephoto end state.

26. A variable magnification optical system according to claim 23, wherein the following conditional expression is satisfied:

$$20.000°<2\omega w<45.000°$$

where 2ωw denotes a total angle of view of the variable magnification optical system in a wide angle end state.

27. A variable magnification optical system according to claim 23, wherein the following conditional expression is satisfied:

$$1.500<(\beta 1nt-1)*\beta Rt<4.500$$

where β1nt denotes a transverse magnification of the first negative lens group in the telephoto end state, and βRt denotes a composite transverse magnification of all lens groups disposed at a more image side than the first negative lens group in the telephoto end state.

28. A variable magnification optical system according to claim 23, comprising, in order from the object side, the first positive lens group having positive refractive power, the first negative lens group, a second positive lens group having positive refractive power, the second negative lens group and the third negative lens group, wherein the following conditional expression is satisfied:

$$0.500<m12tw/fw<2.000$$

where m12tw denotes an amount of change of a distance between the first positive lens group and the first negative lens group upon varying the magnification from the wide angle end state to the telephoto end state.

29. A variable magnification optical system according to claim 23, comprising, in order from the object side, the first positive lens group having positive refractive power, the first negative lens group, a second positive lens group having positive refractive power, the second negative lens group and the third negative lens group, wherein the following conditional expression is satisfied:

$$0.150<(-f1n)/f1p<0.350$$

where f1n denotes a focal length of the first negative lens group, and f1p denotes a focal length of the first positive lens group.

30. A variable magnification optical system according to claim 23, comprising, in order from the object side, the first positive lens group having positive refractive power, the first negative lens group, a second positive lens group having positive refractive power, the second negative lens group and the third negative lens group, wherein the following conditional expression is satisfied:

$$0.050<f2n/f3n<1.500$$

where f2n denotes a focal length of the second negative lens group.

31. An optical equipment comprising a variable magnification optical system according to claim 23.

32. A method for manufacturing a variable magnification optical system which comprises a plurality of lens groups including a first negative lens group having negative refractive power, a second negative lens group disposed at a more image side than the first negative lens group and having negative refractive power, and a third negative lens group disposed at a more image side than the second negative lens group and having negative refractive power; the method comprising the following steps of:

constructing such that, upon varying a magnification, distances between the adjacent lens groups are varied;

constructing such that one of the following features A or B is satisfied:

the feature A comprising:

constructing such that the second negative lens group is moved along the optical axis upon carrying out focusing, and constructing such that the following conditional expressions are satisfied:

$$0.500<(-f3n)/\sqrt{(fw*ft)}<2.500$$

$$0.150<Bfaw/fw<0.500$$

where f3n denotes a focal length of the third negative lens group, fw denotes a focal length of the variable magnification optical system as a whole in a wide angle end state, ft denotes a focal length of the variable magnification optical system as a whole in a telephoto end state, and Bfaw denotes an air converted back focus of the variable magnification optical system as a whole in the wide angle end state; and the feature B comprising:

constructing such that a first positive lens group having positive refractive power is disposed at a more object side than the first negative lens group;

constructing such that the first negative lens group is movable with a movement component in a direction perpendicular to the optical axis as a vibration reduction lens group;

constructing such that the second negative lens group is moved upon carrying out focusing, and constructing such that the following conditional expressions are satisfied:

$$0.010 < (-f3n)/f1p < 3.000$$

$$0.150 < Bfaw/fw < 0.500$$

where f3n denotes a focal length of the third negative lens group, f1p denotes a focal length of the first positive lens group, Bfaw denotes an air converted back focus of the variable magnification optical system as a whole in the wide angle end state, and fw denotes a focal length of the variable magnification optical system as a whole in a wide angle end state.

\* \* \* \* \*